(12) United States Patent
Peitzke et al.

(10) Patent No.: US 8,753,100 B2
(45) Date of Patent: Jun. 17, 2014

(54) MULTIPLE ROTOR FLUID TRANSFER ENGINE

(75) Inventors: William R. Peitzke, Montecito, CA (US); Matthew Brown, San Diego, CA (US); James G. P. Dehlsen, Montecito, CA (US); Christopher J. Grieco, Buellton, CA (US)

(73) Assignee: Gyroton Corporation, Santa Barbara, CA (US)

( * ) Notice: Subject to any disclaimer, the term of this patent is extended or adjusted under 35 U.S.C. 154(b) by 38 days.

(21) Appl. No.: 13/494,674

(22) Filed: Jun. 12, 2012

(65) Prior Publication Data
US 2012/0251374 A1 Oct. 4, 2012

Related U.S. Application Data

(60) Division of application No. 12/391,070, filed on Feb. 23, 2009, now Pat. No. 8,215,935, which is a continuation-in-part of application No. 11/189,137, filed on Jul. 25, 2005, now Pat. No. 7,493,885, which is a continuation of application No. 09/570,323, filed on May 12, 2000, now Pat. No. 6,955,153.

(51) Int. Cl.
*F04C 2/00* (2006.01)
*F04C 18/00* (2006.01)

(52) U.S. Cl.
USPC ............ 418/196; 418/15; 418/132; 418/188; 123/241; 123/244; 123/246

(58) Field of Classification Search
CPC ............ F01C 1/20; F04C 2/165; F04C 15/06; F04C 15/0026; F04C 15/0023; F04C 2/20; F04C 2/12; F04C 28/10; F04C 29/12; F02B 53/00; Y02T 10/17
USPC ................ 418/196, 15, 132, 183, 186–188; 123/241, 244, 246, 232
See application file for complete search history.

(56) References Cited

U.S. PATENT DOCUMENTS

| | | | | | |
|---|---|---|---|---|---|
| 4,776 | A | * | 9/1846 | Miller | 418/188 |
| 273,916 | A | * | 3/1883 | Tverskoy | 418/196 |
| 806,399 | A | * | 12/1905 | Cunningham | 418/196 |
| 892,201 | A | * | 6/1908 | Welsh et al. | 418/248 |
| 973,190 | A | * | 10/1910 | Green | 418/196 |
| 2,275,205 | A | * | 3/1942 | Straub | 418/196 |
| 3,358,652 | A | * | 12/1967 | Lawrence | 418/196 |
| 4,086,880 | A | * | 5/1978 | Bates | 418/196 |
| 4,741,308 | A | * | 5/1988 | Ballinger | 418/227 |
| 6,129,067 | A | * | 10/2000 | Riley | 123/246 |
| 6,955,153 | B1 | * | 10/2005 | Peitzke et al. | 123/244 |
| 7,493,885 | B2 | * | 2/2009 | Peitzke et al. | 123/244 |

* cited by examiner

*Primary Examiner* — Theresa Trieu
(74) *Attorney, Agent, or Firm* — Felix L. Fischer

(57) ABSTRACT

A fluid transfer engine employs a case with a cylindrical inner wall having an operating radius extending from a case axis. A main rotor is carried within the case and incorporates a lobe with a major radius equal to and concentric with the operating radius of the case, the main rotor having a minor radius defining a body. Two peripheral rotors are diametrically opposed with respect to the case axis and rotate within rotor chambers extending from the case. Each peripheral rotor has a radius equal to the minor radius and a center of rotation located at twice the minor radius from the case axis. Each of the peripheral rotors rotates in uniform circular motion with the main rotor in sealing contact with the body and incorporates a sculpted recess for receiving the lobe of the main rotor.

5 Claims, 39 Drawing Sheets

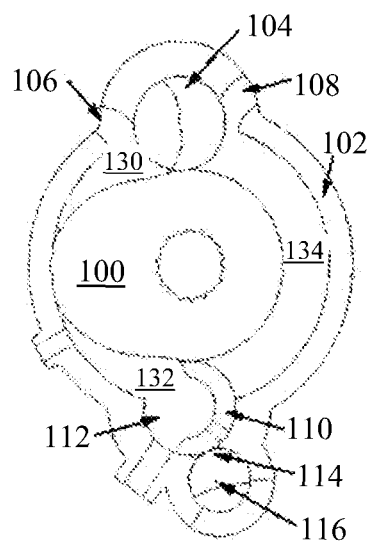
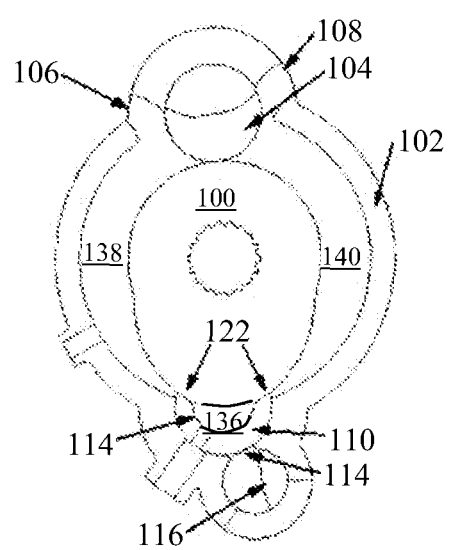
FIG. 1B    FIG. 1C
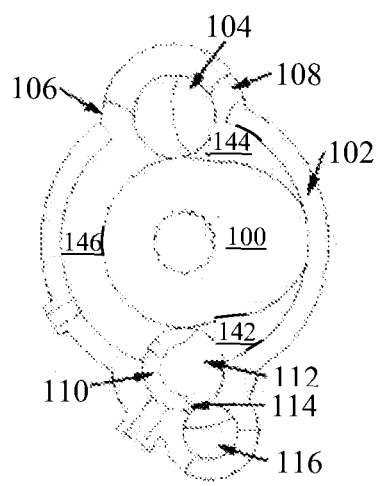
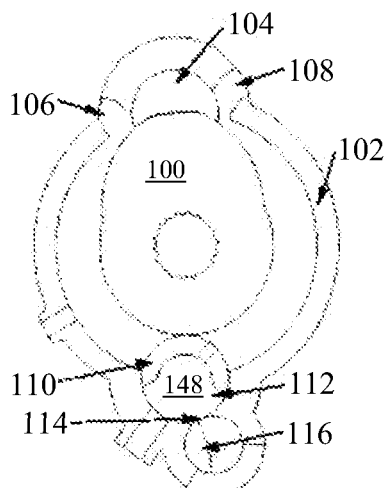
FIG. 1D    FIG. 1E

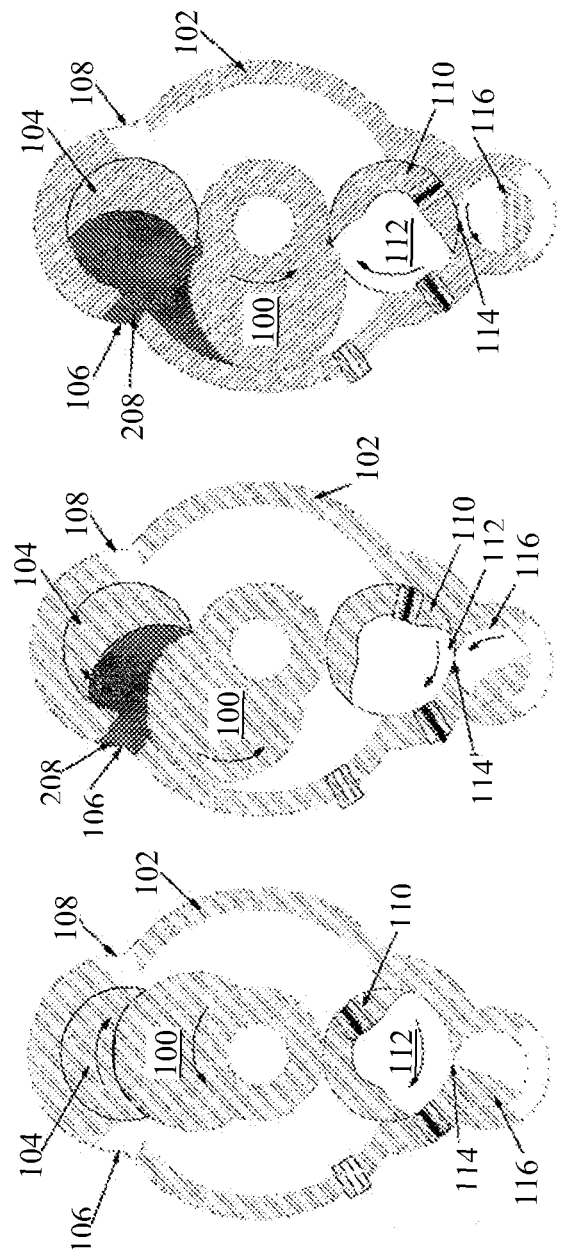

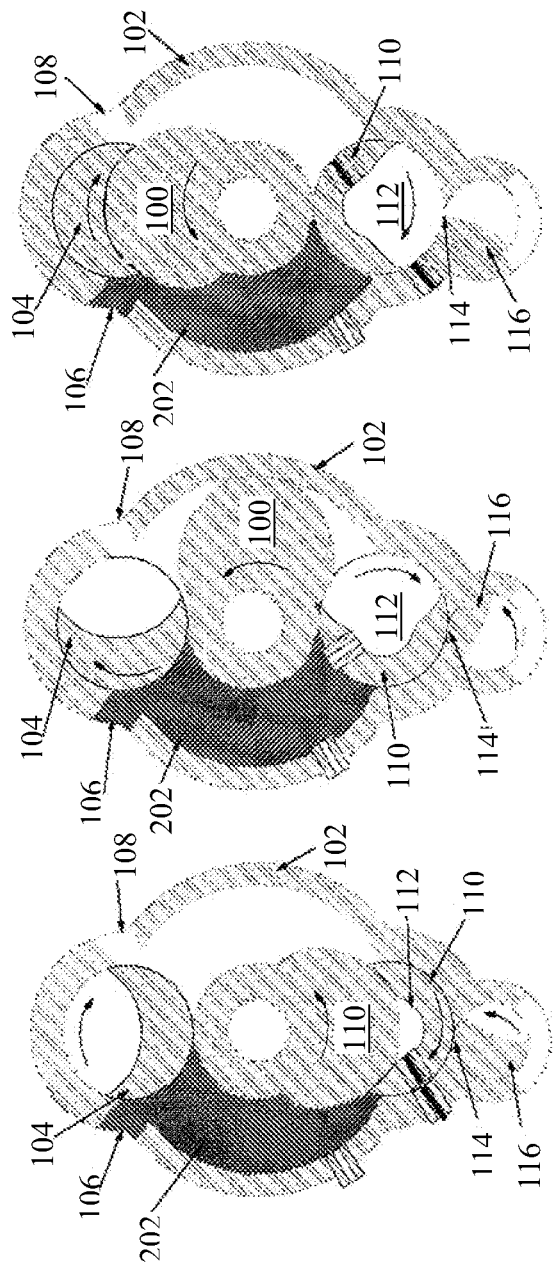

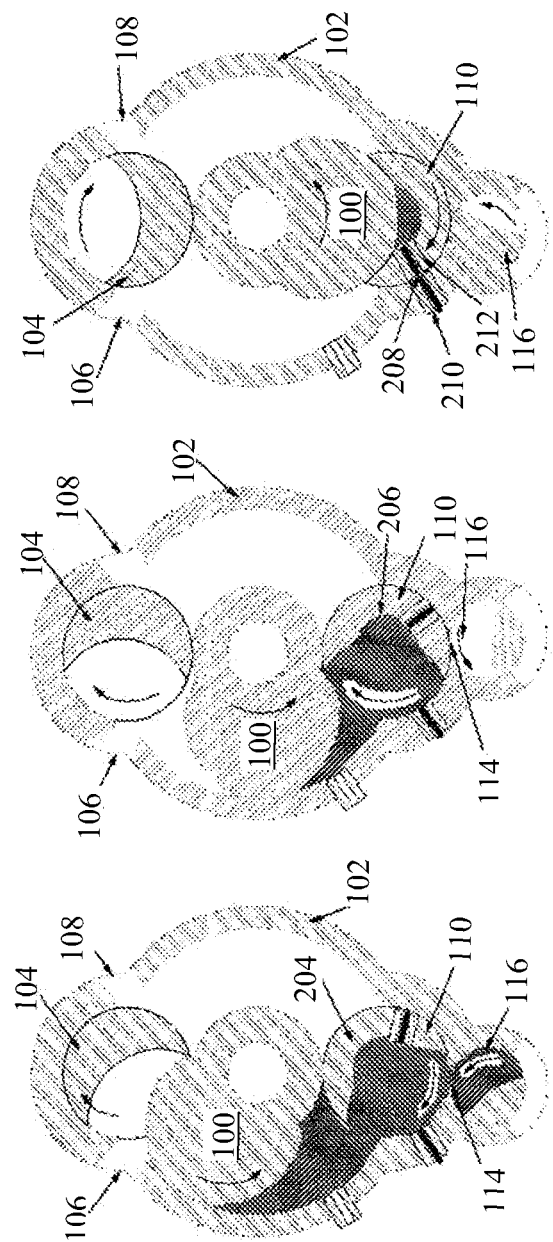

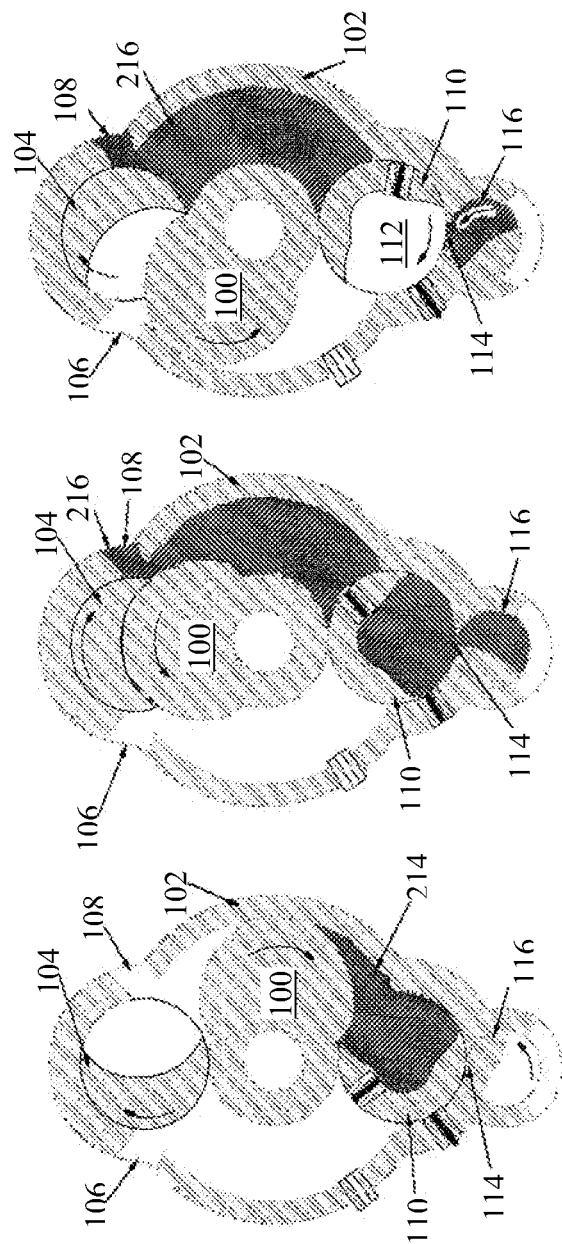

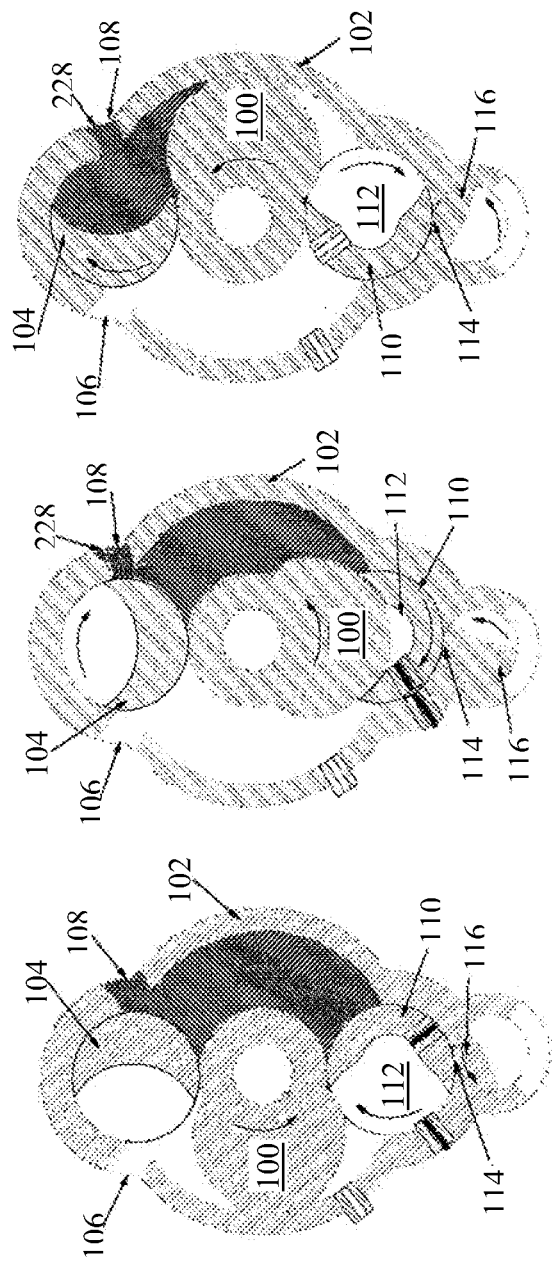

MULTIPLE ROTOR FLUID TRANSFER ENGINE

REFERENCE TO RELATED APPLICATIONS

This application is a divisional of application Ser. No. 12/391,070 filed on Feb. 23, 2009 entitled Multiple Rotor Fluid Transfer Engine which is a continuation in part of application Ser. No. 11/189,137 filed on Jul. 25, 2005 entitled Asymmetric Complete Expansion Rotary Engine Cycle now issued as U.S. Pat. No. 7,493,885 on Feb. 24, 2009 which is in turn a continuation of application Ser. No. 09/570,323 having a filing date of May 12, 2000 entitled Asymmetric Complete Expansion Rotary Engine Cycle, issued as U.S. Pat. No. 6,955,153 on Oct. 18, 2005, all having a common assignee with the present application, the disclosures of which are both incorporated herein by reference.

BACKGROUND

1. Field

This invention relates to engines for fluid transfer including hydraulic pumps/motors and gas compressor/expanders, and more particularly to multiple rotor engines employing uniform circular motion of multiple interacting rotors.

2. Description of the Related Art

Creation of high efficiency in fluid transfer engines is driven by the requirements for maximizing displacement volumes while minimizing fluid momentum interruptions. Current reciprocating engines, rod pumps and vane devices do not provide desired efficiencies. Further, these devices tend to be mechanically complex and thus costly and difficult to maintain.

It is therefore desirable to provide a simple engine for fluid transfer which provides high efficiency with mechanical reliability and lower cost.

SUMMARY OF THE INVENTION

The embodiments disclosed herein provide a fluid transfer engine employing a case with a cylindrical inner wall having an operating radius extending from a case axis. A main rotor is carried within the case and incorporates a lobe with a major radius equal to and concentric with the operating radius of the case, the main rotor having a minor radius defining a body. Two peripheral rotors are diametrically opposed with respect to the case axis and rotate within rotor chambers extending from the case. Each peripheral rotor has a radius equal to the minor radius and a center of rotation located at twice the minor radius from the case axis. Each of the peripheral rotors rotates in uniform circular motion with the main rotor in sealing contact with the body and incorporates a sculpted recess for receiving the lobe of the main rotor.

One embodiment is characterized by an axle supporting the main rotor for rotation within the case wherein the lobe includes a first port on an advancing surface of the lobe and a second port on a retreating surface of the lobe. The first port communicates with a first conduit in the axle and the second port communicates with a second conduit in the axle. Operation of the embodiment as either a pump or motor can then be accomplished.

An additional embodiment is characterized by cylindrical extensions extending longitudinally from each extent of the recess in the peripheral rotors. The case incorporates a cover where the cover and case each have a sealing surface for an upper surface and lower surface of the main rotor lobe respectively and the lobe includes a bore having an aperture in at least one of the upper or lower surface communicating with a first conduit in the axle, the first conduit receiving pressurized gas for expansion. The cylindrical extensions including at least one transfer depressions in one of the cylindrical extensions in each peripheral rotor for communication with the aperture. An expansion volume is formed by a first of the peripheral rotors and the retreating surface of the lobe. The advancing surface of the lobe incorporates a port communicating with a second conduit in the axle and displaces expanded gas in the operating volume between the advancing surface of the lobe and a second of the peripheral rotors.

Yet another embodiment is characterized by the lobe including a chamber communicating with the advancing surface of the lobe and with a first conduit in the axle to compress gas in an operating volume intermediate the advancing surface of the lobe and a first of the peripheral rotors. A port in the retreating surface of the lobe communicates with a second conduit in the axle and replenishes gas in an operating volume intermediate the retreating surface of the lobe and a second of the peripheral rotors.

BRIEF DESCRIPTION OF THE DRAWINGS

These and other features and advantages of the various embodiments will be better understood by reference to the following detailed description when considered in connection with the accompanying drawings wherein:

FIGS. 1B-1E illustrate the embodiment at four different rotational positions.

FIGS. 3A-3P follow a volume of air through the present invention to illustrate the processes undergone by the volume;

DETAILED DESCRIPTION

Figure 1A:
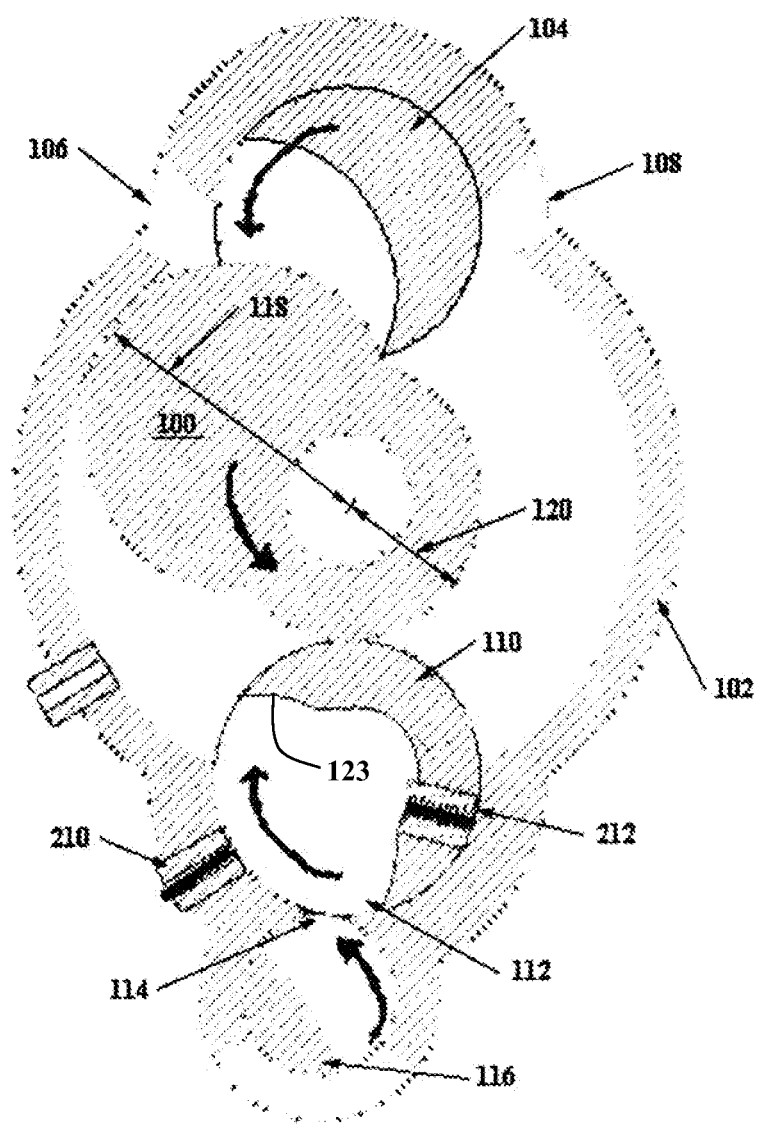
FIG. 1A is a conceptual diagram of an embodiment of the present invention, illustrating the relationships of the major components for an internal combustion engine.

An embodiment of the present invention employed as an internal combustion engine shown in FIG. 1A consists of a cylindrical housing 102 in which an oblong main rotor 100 spins. A clearance rotor 104 is located between an intake port 106 and an exhaust port 108 and rotates partially within the main cylinder so as to engage and form seals with the main rotor 100. A compression rotor 110 is also located to spin partially within the main cylinder so as to engage and form seals with the main rotor. The compression rotor also serves substantially as the combustion chamber for the cycle. The cylinder 112 in which the compression rotor spins is fit with an exhaust port 114, through which spent gases may be purged by un-fueled air. A purge rotor 116 is connected to this compression rotor exhaust port, enabling the port to be cyclically opened and closed. The four rotors 100, 104, 110, 116 are geared, external to the cylindrical housing via drive shafts on each rotor such that they spin with the same angular velocity. The exact geometry of each component is determined to create precise seals, compression and expansion ratios, and exhaust purging as the main rotor 100 revolves within the engine, while complying with the aforementioned design criteria.

Besides acting as the working surface and torque arm of the engine, the main rotor 100 serves to separate volumes of gas held within the engine. To accomplish this, the main rotor is constructed with two principal radii. The main radius 118 is designed to create a seal with the exterior of the main cylinder 102 while the main rotor is not engaged with the peripheral rotors. The opposite side of the main rotor has a lesser radius 120 designed to create a seal with closed sides of the peripheral rotors.

The clearance rotor 104 is designed to engage the main radius of the main rotor, allowing it to rotate past, while maintaining maximum sealing area throughout the contact. The compression rotor 110 is designed to engage the main rotor's main radius, forming a seal inside of one or both edges 122, allowing the main rotor to rotate past.

During a revolution, the engine is divided by the rotors into six volumes in which the thermodynamic conversions take place, as shown in FIGS. 1B-1E When the main rotor is located between the clearance rotor and the compression rotor, the main rotor separates the intake volume 130 behind the rotor from the compressed volume 132 ahead of the rotor. The clearance and compression rotors separate these volumes from spent gas 134 located on the opposite side of the engine. When the main rotor becomes aligned with the compression rotor and the engine reaches the point of maximum compression, the sealing edges 122 on either side of the compression rotor separate the compressed volume 136 from the clean intake volume 138 and the spent gas 140, both at atmospheric pressure. After combustion, the main rotor separates the expanding combustion products 142 behind the rotor from the spent gas 144 being purged from the engine ahead of the rotor. The seals between the main rotor and the clearance and compression rotors isolate these volumes from the fresh intake volume on the opposite side of the engine 146. When the main rotor becomes aligned with the clearance rotor, the compression rotor is turned away from the main rotor, entrapping pressurized spent gas 148. This gas is allowed to vent through the compression purge rotor 116, and is nearly fully expelled by clean airflow at the beginning of the compression stroke.

Figure 2:
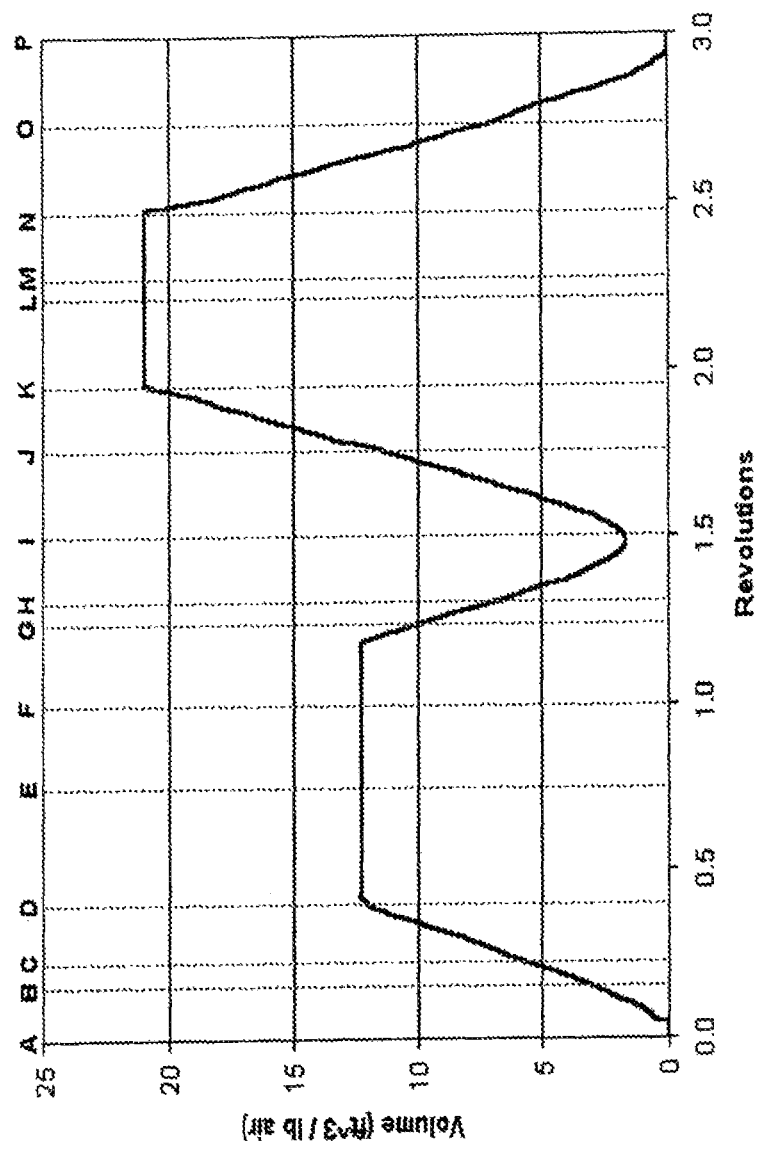
FIG. 2 is a plot of volume versus rotor angle, showing the volume of a charge of air passing through the engine, from intake to exllaust, with rotor positions "a" through "p" identified on the plot.
Figure 3P:
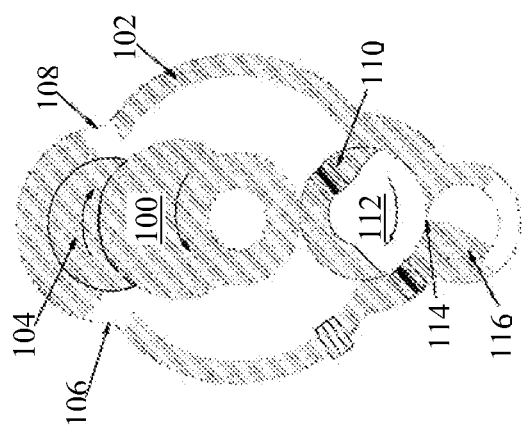

To examine the cycle performed by the engine of the preferred embodiment more fully, it is beneficial to follow a volume of air through the engine, as shown in FIG. 2 and FIGS. 3A-3P. FIG. 2 shows the volume of a charge of air during the three complete revolutions of the main rotor, with specific points identified as "A" through "P", corresponding to FIGS. 3A through 3P. As the main rotor moves between the clearance and the compression rotors, a volume of air 200 is pulled into the engine by the retreating rotor [FIGS. 3A-3D]. As the rotor continues to rotate back to the clearance rotor [FIG. 3E], this volume is not affected 202, except by shear forces from the surface of the back of the main rotor. When the main rotor passes the intake port [FIG. 3T], the compression and purge rotors are aligned such that forced air may purge the residual spent gas from the compression rotor 204 to ensure very little exhaust carry-over. As the main rotor continues to rotate, fuel is injected and the charge of air/fuel mixture is compressed into the combustion chamber 206. When the main rotor is aligned with the combustion chamber [FIG. 3I], a spark is introduced to the chamber, initiating combustion 208. In the preferred embodiment, this sparking current travels through a ceramic insulated conduit which aligns appropriately with a similar ceramic insulated conduit installed in the compression rotor at the rear of the combustion chamber, the current jumps the gap between conduits at points 210 and 212 to an ignition spark gap on the inner face of the combustion chamber in the compression rotor. Expansion of the combustion products occurs [FIG. 3J] as the main rotor continues to rotate 214, exerting work, until the main rotor passes the exhaust port [FIG. 3K] and the pressure is reduced to atmospheric by venting 216. As the rotor continues to move past the clearance rotor and on to alignment with the compression rotor [FIGS. 3L-3M], this volume of spent gas is unaffected, with the exception of shear forces 218. The cycle is finished as the main rotor travels from the compression rotor to the clearance rotor, expelling the spent gas through the exhaust port 220 [FIGS. 3N-3O]. The rotor completes the cycle and returns to its original orientation [FIG. 3P]. FIGS. 2 and 3A-3P show that three full revolutions, or 1,080° of rotation, are required to complete a thermodynamic cycle for each working volume of air.

Figure 4A:
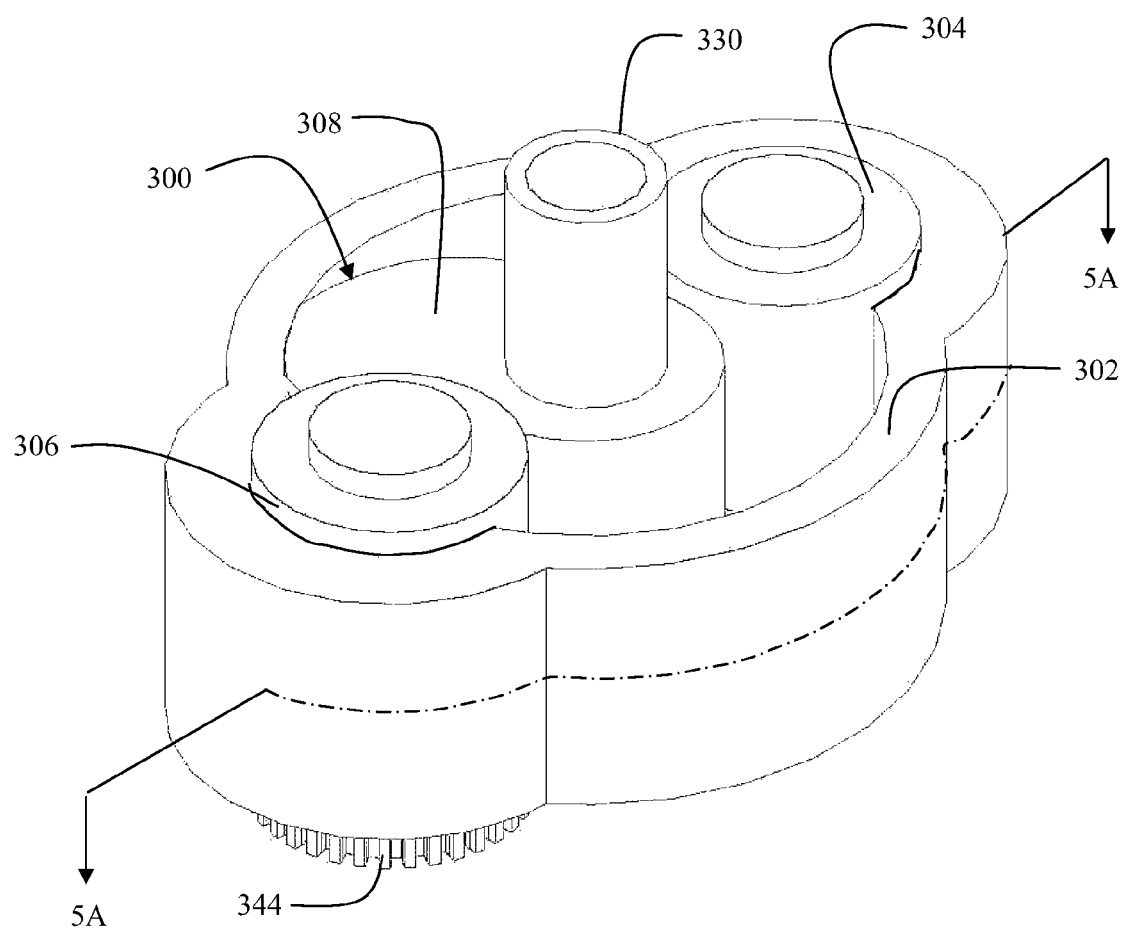
FIG. 4A is an isometric view of a generalized fluid transfer engine configuration employing three rotors.
Figure 4B:
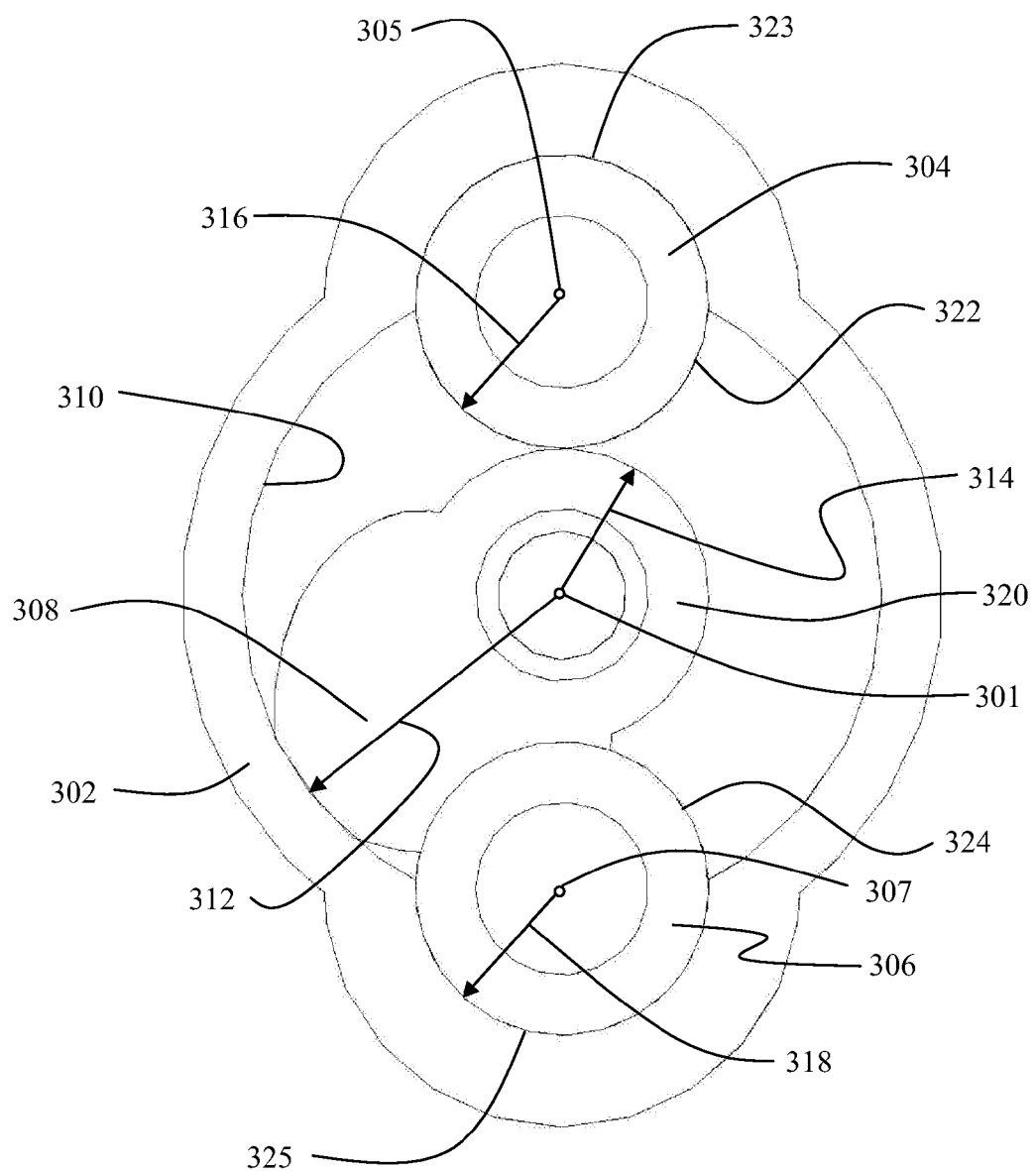
FIG. 4B is a top view of the engine of FIG. 4A without the case cover.

A generalized embodiment of a fluid transfer engine is shown in FIGS. 4A and 4B. Main rotor 300 rotates within a case 302 and engages peripheral rotors 304 and 306 placed in opposed relation on a diameter of the case. The main rotor incorporates an asymmetric lobe 308 contacting an inner cylindrical wall 310 of the case at major radius 312. The main rotor rotates about an axis 301 from which the radii of the cylindrical case wall and main rotor extend. A minor radius 314 of the main rotor is equal to the peripheral rotors' radii, 316 and 318 respectively, and defines a central cylindrical body 320 of the main rotor which contacts outer cylindrical surfaces, 322 and 324 respectively, on each peripheral rotor which rotate with the main rotor in sealing uniform circular motion. The peripheral rotors have centers of rotation, 305 and 307 respectively, located at twice the minor radius from the case axis 301. Peripheral rotors 304 and 306 rotate in semi-cylindrical rotor chambers, 323 and 325 respectively, extending from the case.

Figure 5A:
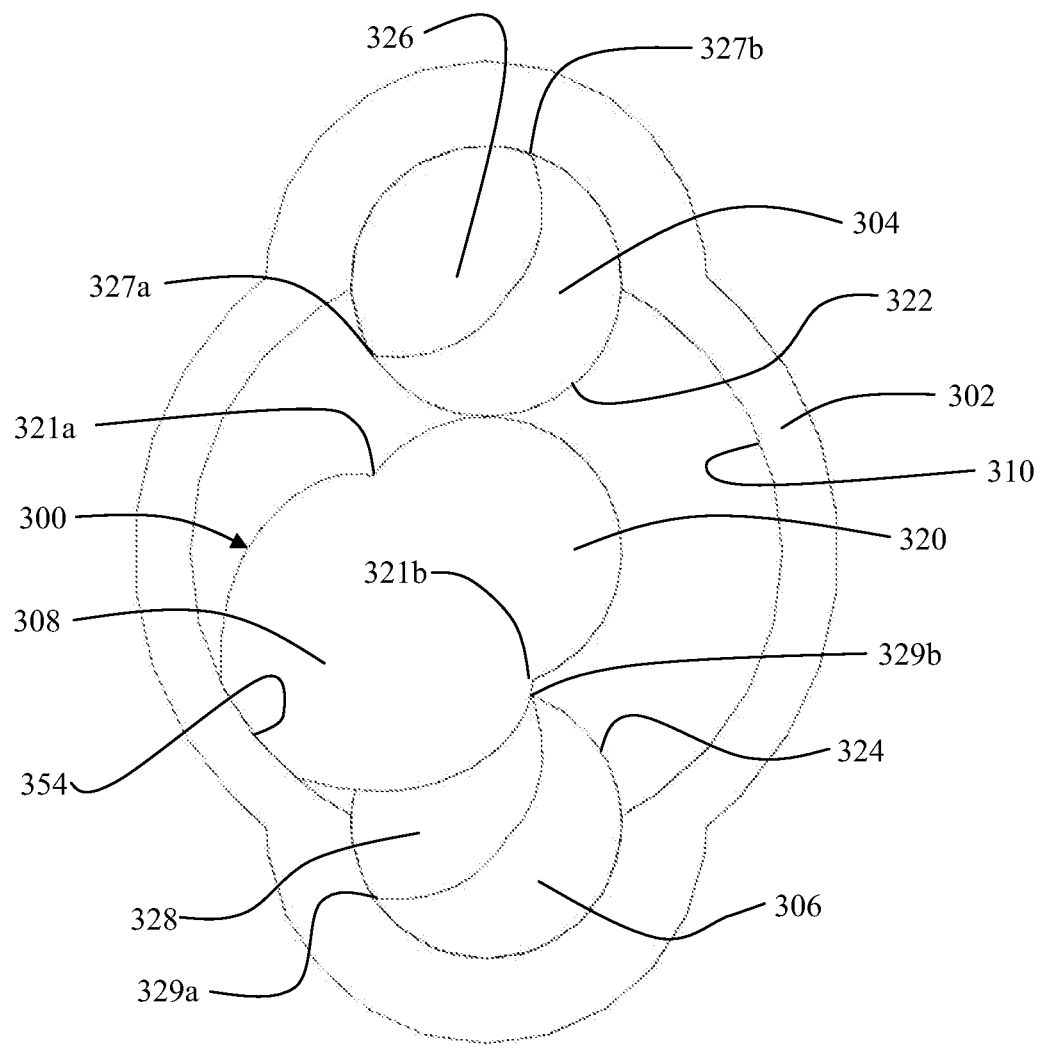
FIG. 5A is a top section view of a pump/motor implementation of the basic embodiment of FIGS. 4A and 4B.

FIG. 5A provides a top section view through plane 5A-5A of FIG. 4A for an initial embodiment of the generalized fluid transfer machine which may be employed as a pump or motor for liquid applications such as hydraulic fluid or water. As shown in FIG. 5A, the peripheral rotors each incorporate a sculpted recess, 326 and 328 respectively, in the closed sides formed by outer cylindrical surfaces 322 and 324, which sealingly receive the lobe of the main rotor during rotation. As the main rotor rotates the asymmetrical lobe sweeps through the case maintaining sealing contact with inner cylindrical surface 310 of case 302. The lobe then rotates through the recesses in the peripheral rotors in sealing contact. FIG. 5A shows leading edges 327a and 329a and trailing edges 327b and 329b of the recesses and vertices 321a and 321b at the intersection of the asymmetrical lobe and cylindrical body of the main rotor whose function will be described in greater detail subsequently.

Figure 5B:
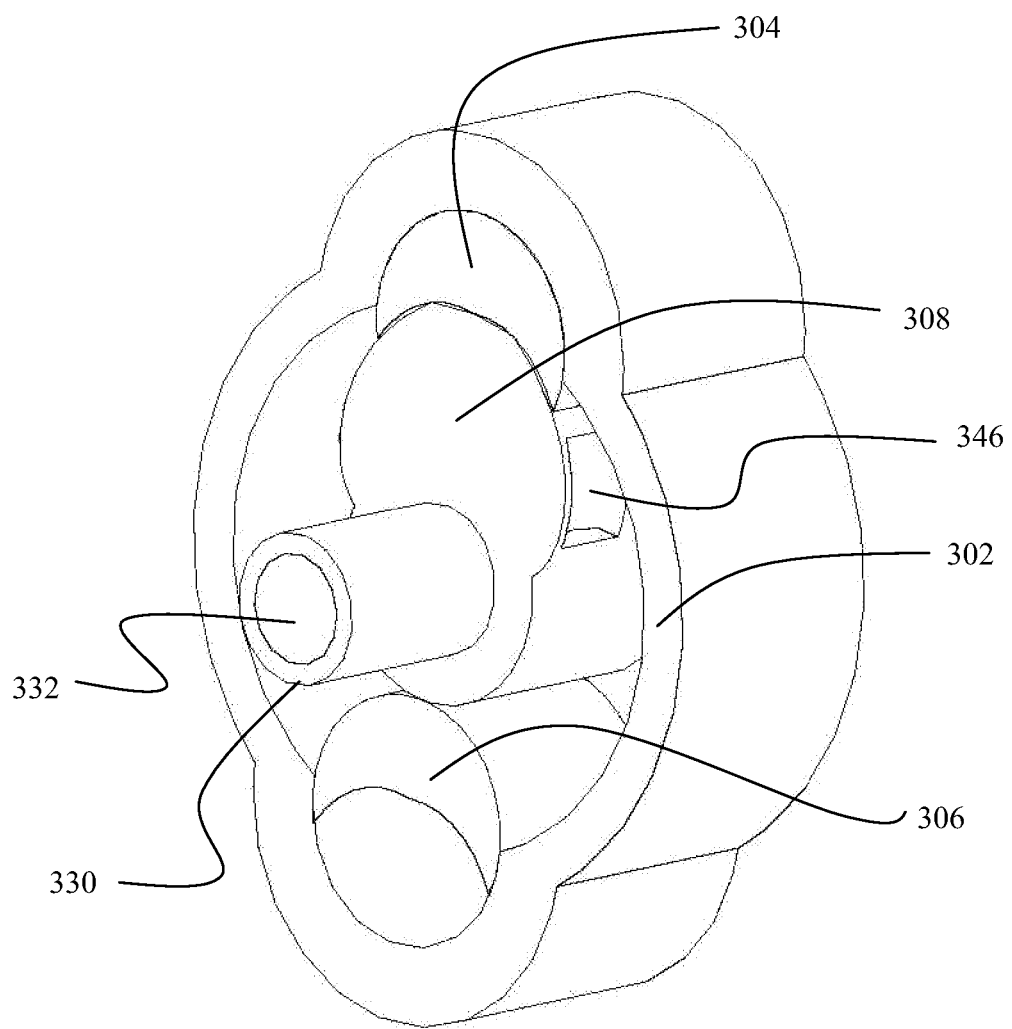
FIG. 5B is an isometric view of the pump/motor of FIG. 5A.
Figure 5C:
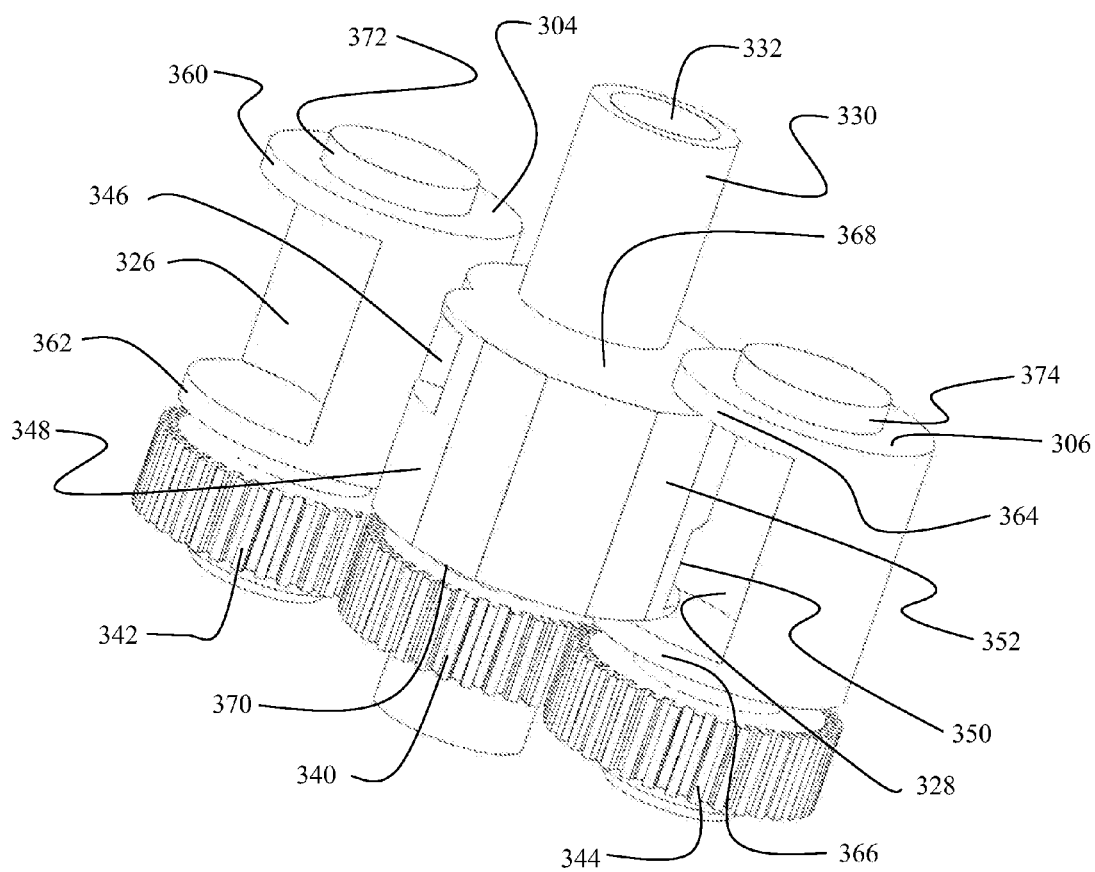
FIG. 5C is an isometric view of the pump/motor rotors without the case and case cover.
Figure 5D:
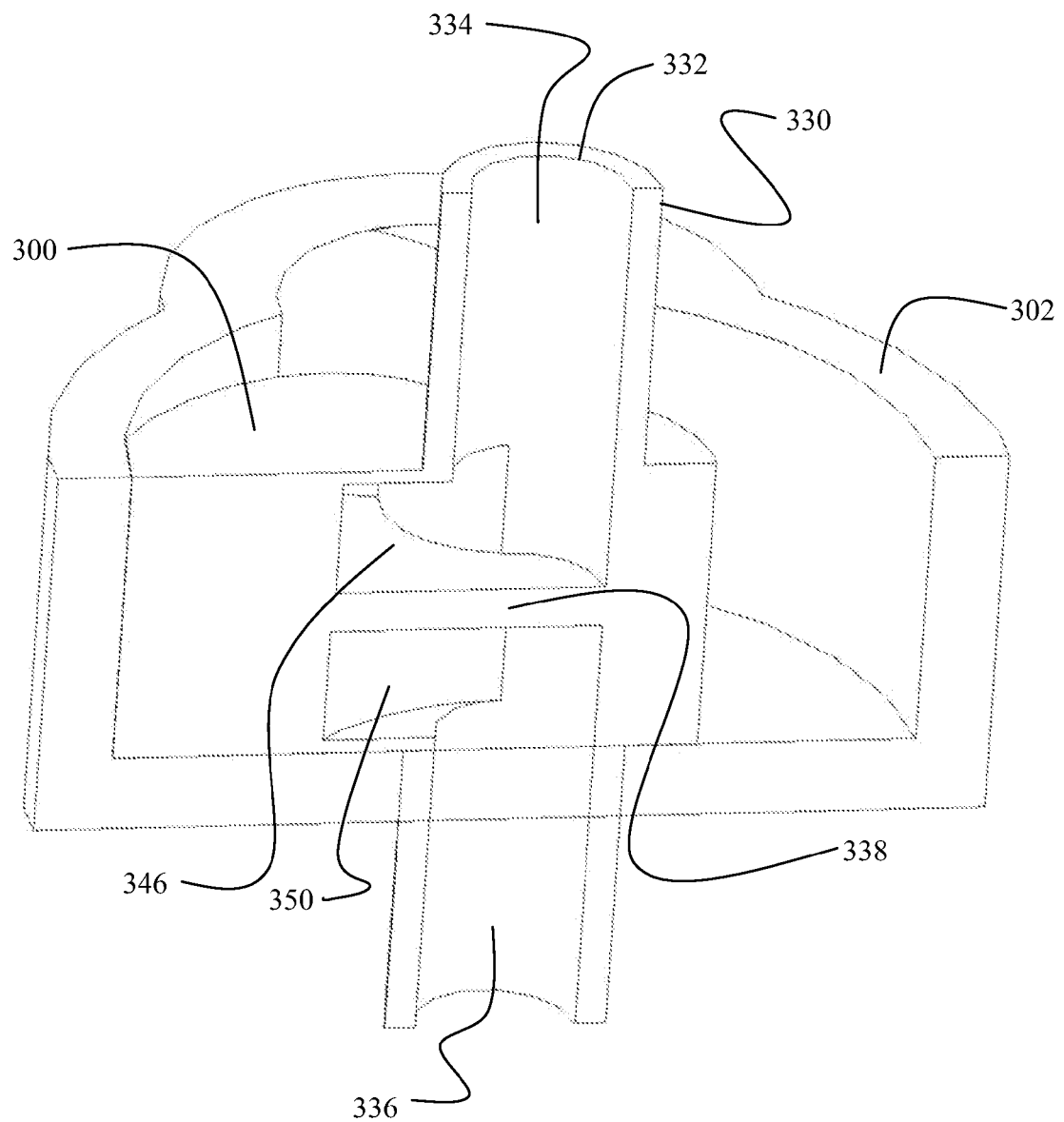
FIG. 5D is an isometric section view of the pump/motor showing the inlet and outlet flow chambers.

As seen in FIGS. 5B through 5D, the pump/motor of this embodiment incorporates an axle 330 having a bifurcated central bore 332 with an upper conduit 334 and a lower conduit 336 separated by a septum 338. The axle additionally provides the mechanical interface for power input for a pump or power extraction from a motor implementation of the embodiment. As best seen in FIG. 5C, gears 340, 342 and 344, connected to the main rotor and peripheral rotors respectively, maintain the uniform circular motion of the rotors.

For alternative embodiments, the axle 330 may be held stationary and the case, including the rotor chambers and peripheral rotors, rotated about the main rotor. References herein to rotation of the main rotor may therefore be interpreted to alternatively provide rotation of the case about the main rotor.

A first port 346 extending from surface 348 of the main rotor lobe connects to the upper conduit 334 while second port 350 extending from surface 352 of the main rotor lobe connects to the lower conduit 336. A sealing arcuate bight 354 on the lobe separates the surface 348 from surface 352. Arcuate bight 354 may vary from a point contact to a 40° arc in various embodiments to achieve desired sealing and operating efficiency as will be described in greater detail subsequently.

As best seen in FIG. 5C, peripheral rotors 304 and 306 incorporate upper and lower cylindrical extensions 360, 362 and 364, 366 respectively which extend beyond recesses 326 and 328 to sealingly engage a top surface 368 and bottom surface 370 of the main rotor lobe. The cylindrical extensions are received in recesses in the case and case cover. Bearing rings 372 and 374 extend from the top surface of the peripheral rotors to be received in associated bearing recesses in the case cover. Bearing surfaces are also provided intermediate the lower cylindrical extensions and the gears.

Figure 6A:
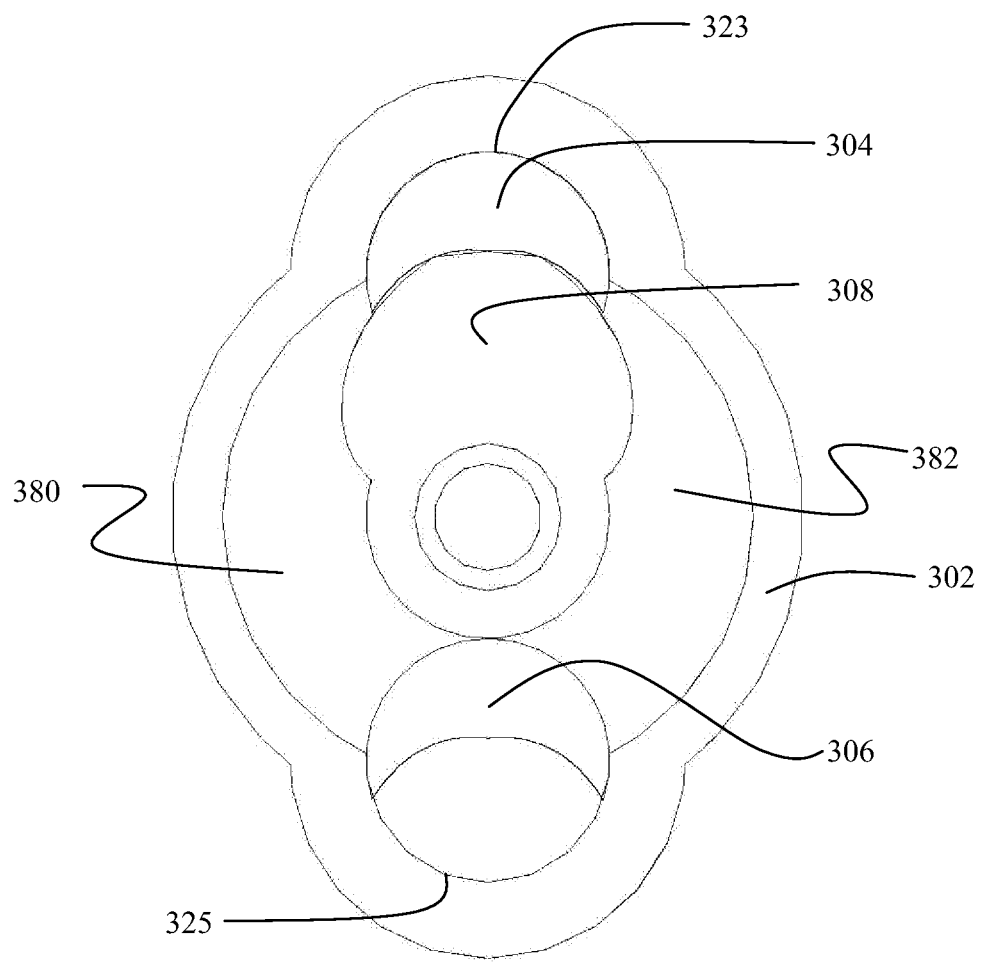
FIGS. 6A-6E are top section views of 5 rotation points for 180° of rotation in the cycle of the pump/motor embodiment of FIG. 5A.

Operation of the pump/motor embodiment is shown in FIGS. 6A-6E for 180° of rotation. FIGS. 6A-6E should be viewed in conjunction with FIG. 5D for reference to the various ports. A first position with the lobe of the main rotor centered on the diametric centerline extending between the peripheral rotors, referred to herein for convenience as "top dead center" based on the orientation of the drawings is shown in FIG. 6A. In this position, lobe 308 of the main rotor is received in sealing engagement in the recess of peripheral rotor 304. Cylindrical body 320 of the main rotor is in rolling sealing engagement with outer cylindrical surface 324 of peripheral rotor 306. The recess of peripheral rotor 306 is closed with leading and trailing edges within rotor chamber 325. Separated fluid operating volumes 380 and 382 are then present in the case.

Figure 6B:
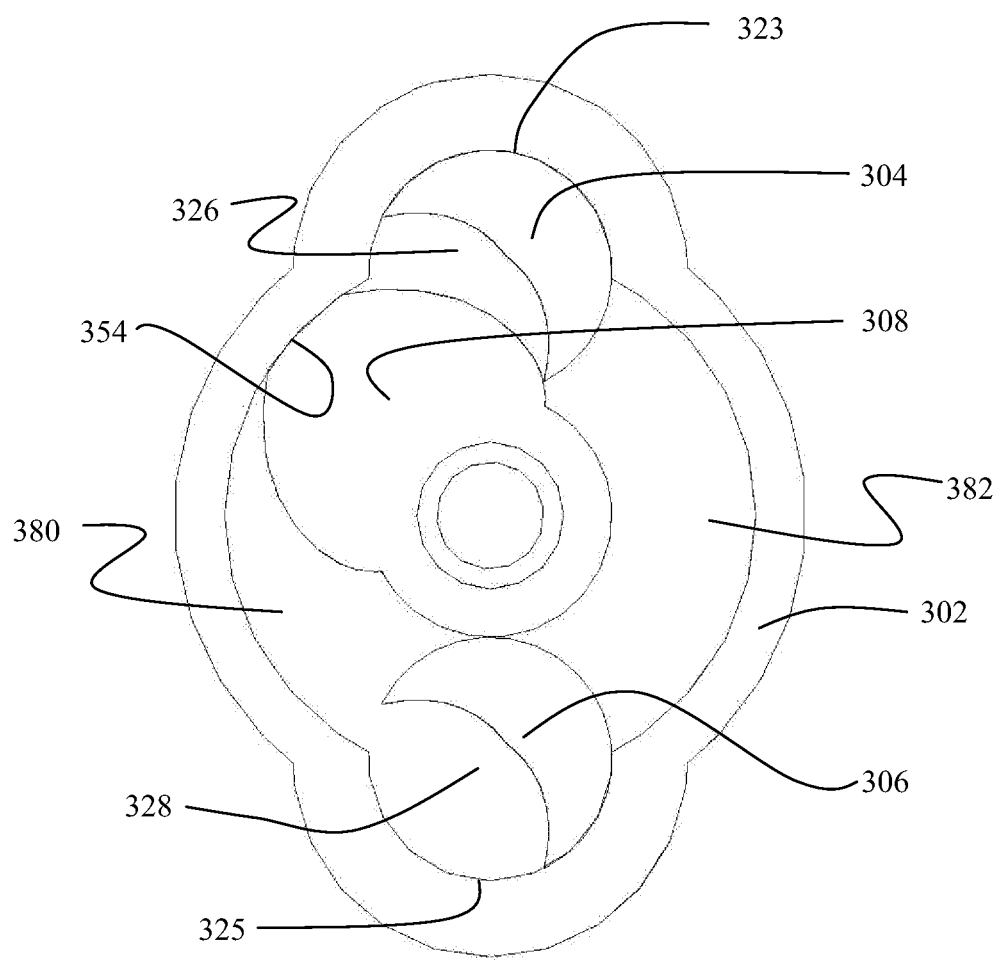

Using the pump configuration of the embodiment as exemplary, as the main rotor rotates counterclockwise to the position shown in FIG. 6B at 45° of rotation, fluid in operating volume 380 is received into port 350 in the lobe and is pumped into conduit 336 as the lobe rotates. Rotation of the lobe and peripheral rotor 304 opens the recess 326 of the peripheral rotor, sealed by leading edge 327a engaging the main rotor, into which fluid from port 346 received through conduit 334 flows following the retreating lobe. Rotation of peripheral rotor 306 opens recess 328 forming a terminating volume in communication with operating volume 380 which is sealed by cylindrical surface 324 in contact with the main rotor. Bight 354 on the lobe seals against the inner cylindrical surface 310 of the case separating the initiating volume and operating volume 380 for the incoming fluid charge.

Figure 6C:
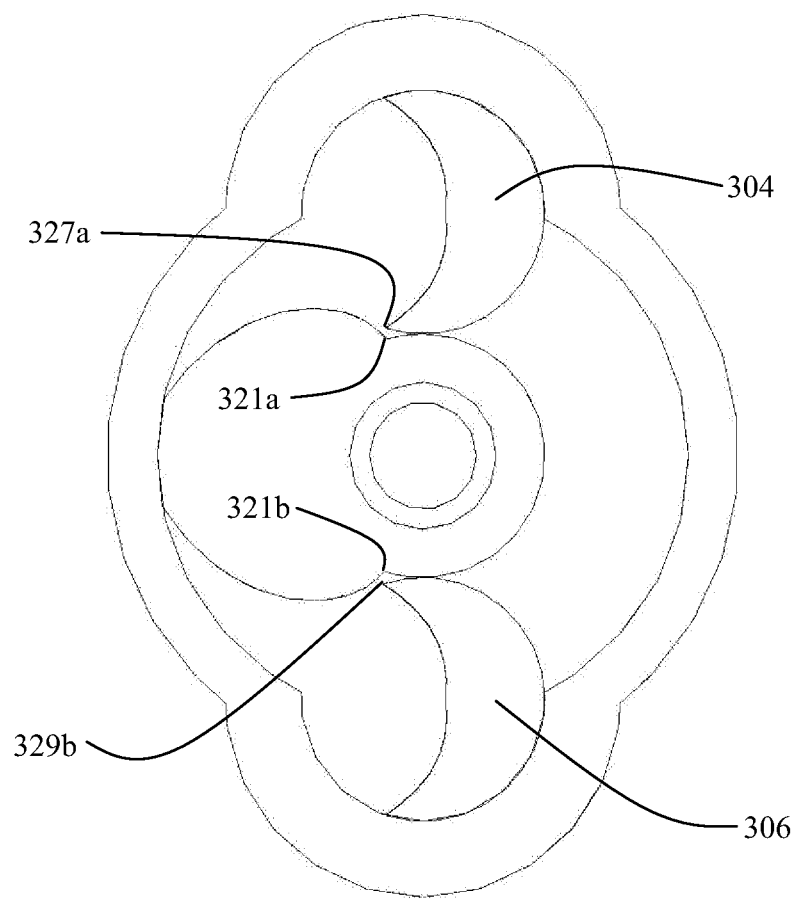

As seen in FIG. 6C when the main rotor has rotated 90°, both peripheral rotors have also rotated 90°. Leading edge 327a of rotor 306 has just rotated through contact with vertex 321a departing from the surface of the main rotor with sealing now taking place between cylindrical surface 322 and the main rotor body 320. Lobe 308 has swept through half of operating volume 380 pumping fluid constrained between the advancing lobe and recess 328 in rotor 306. Cylindrical surface 324 of rotor 306 remains in sealing contact with the main rotor but trailing edge 329b is approaching contact with vertex 321b.

Figure 6D:
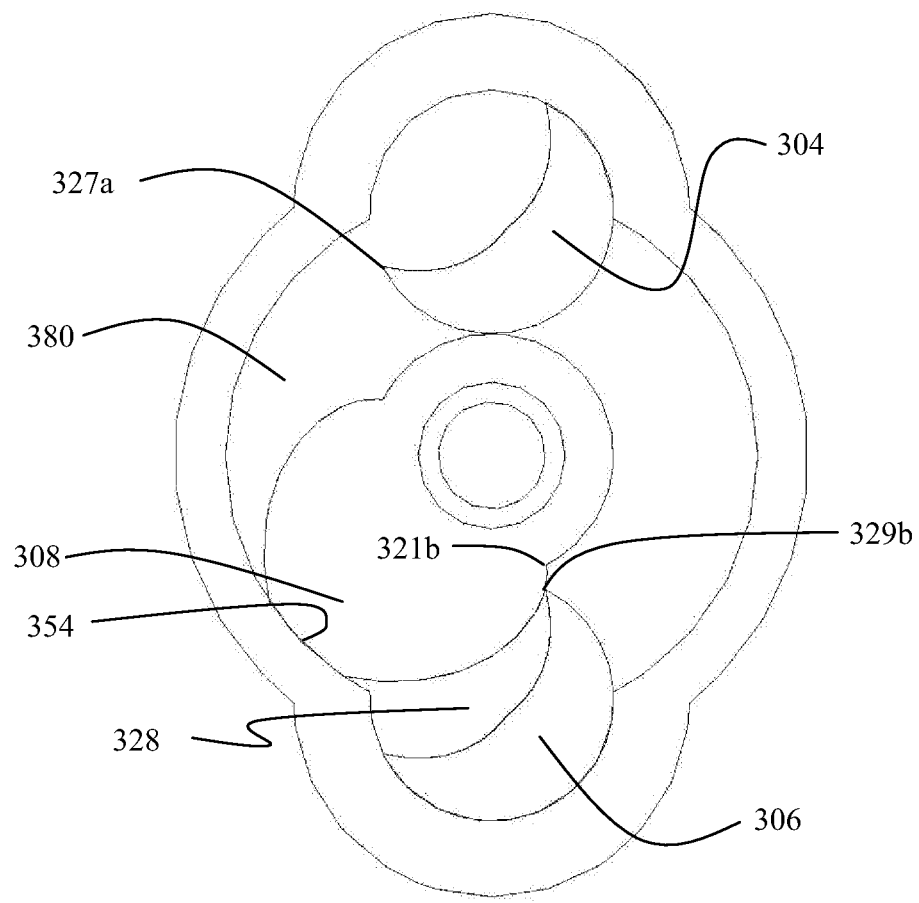

FIG. 6D shows the main rotor at 135° of rotation. Lobe 308 of the main rotor is now closing recess 328 in rotor 306 displacing remaining fluid into port 350. Trailing edge 329b has passed through contact with vertex 321b and is sealing against the surface of the lobe until bight 354 on the lobe begins sealing contact with the sculpted surface of the recess. Rotor 304 is approaching closure of the recess with leading edge 327a approaching the rotor chamber. Operating volume 380 continues to fill with fluid from port 346 in the retreating surface of the lobe.

Figure 6E:
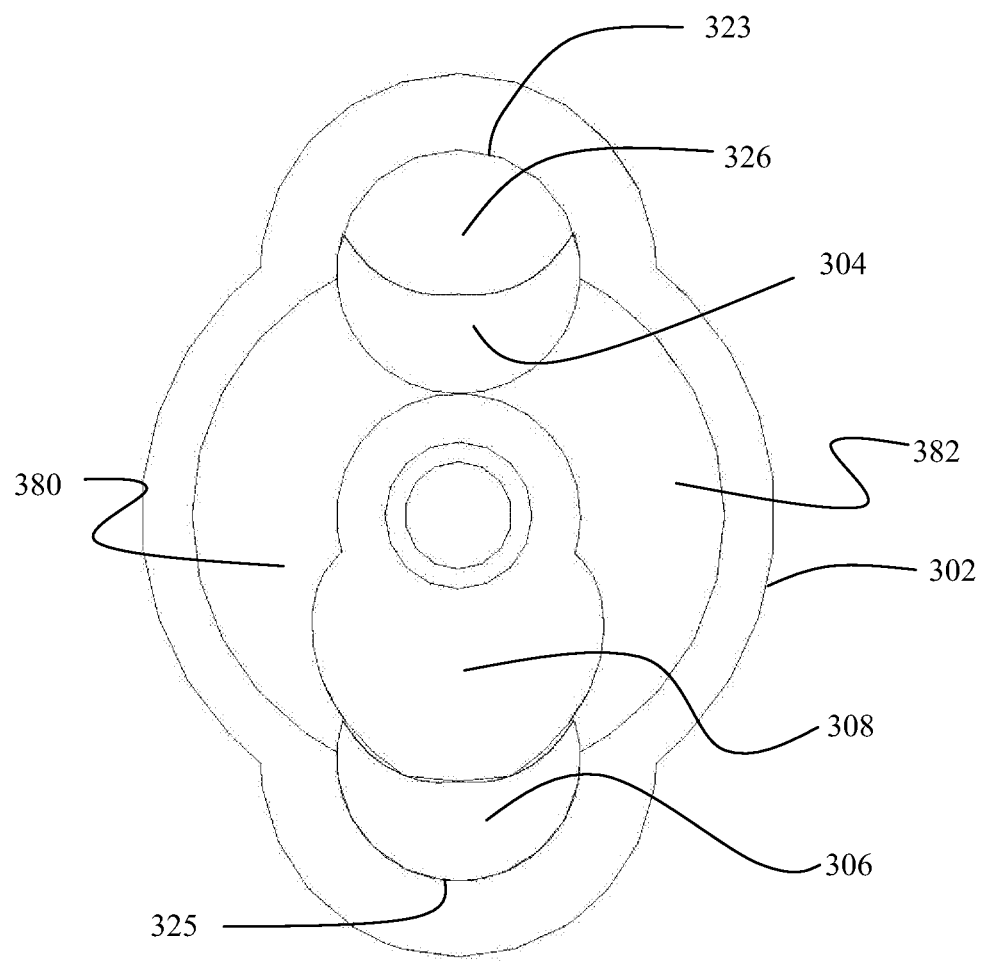

FIG. 6E shows the system with the main rotor at 180° of rotation, "bottom dead center" with respect to the drawing orientation. Substantially all fluid present in the operating volume 380 and recess 328 in rotor 306 when the cycle started in FIG. 6A has been displaced into port 350. Operating volume 380 has been recharged with fluid from port 346 in the retreating surface of the lobe. Recess 326 in rotor 304 has closed in rotor chamber 323 with fluid at inlet conditions. As rotation of the rotors continues, recess 326 is opened into operating volume 382 with fluid at comparable conditions provided through port 346 in the retreating surface of the lobe from the 180° of rotation of the cycle prior to beginning description with respect to FIG. 6A. Operation of the cycle through the next 180° from bottom dead center to top dead center is identical to that described with respect to FIGS. 6A through 6E with the operation of peripheral rotors 304 and 306 exchanged in function and operating volume 382 active.

A motor embodiment operates in substantially identical fashion with pressurized fluid entering through the port in the retreating surface of the lobe forcing rotation with spent fluid charge from the prior rotation cycle being displaced into the port in the advancing surface of the lobe. Displacement volume for the pump/motor constitutes the volume of operating volume 380 or 382 plus the volume of the closed recess in the rotor opposite the rotor in contact with the lobe. The pump/motor as disclosed operates at a substantially constant flow rate throughout the rotational cycle without any dead point.

The associated soft pressure rise would allow use in applications where pumping of marine life entrained in the fluid flow could be accomplished.

Figure 7A:
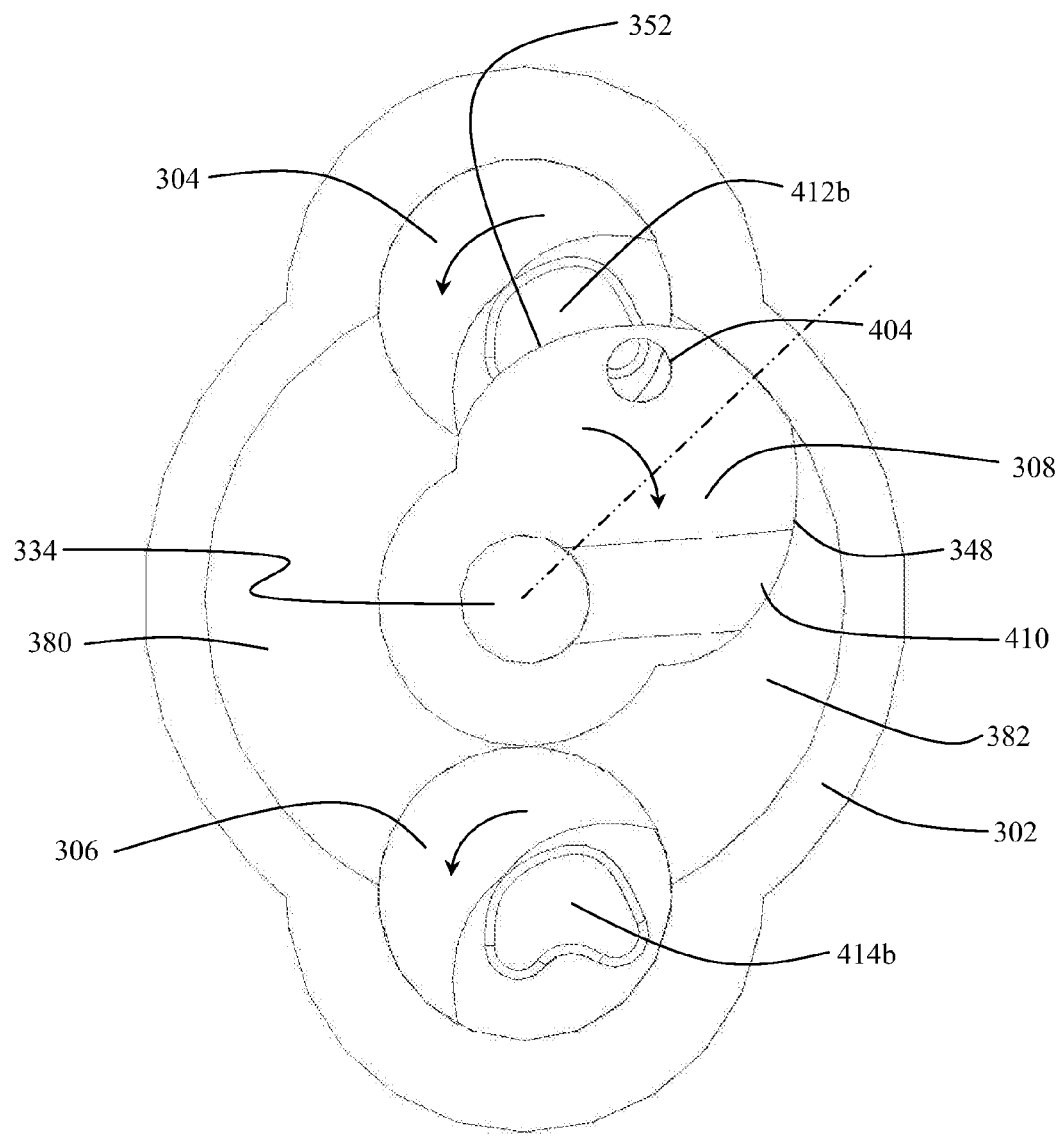
FIG. 7A is top section view of an expander embodiment.
Figure 7B:
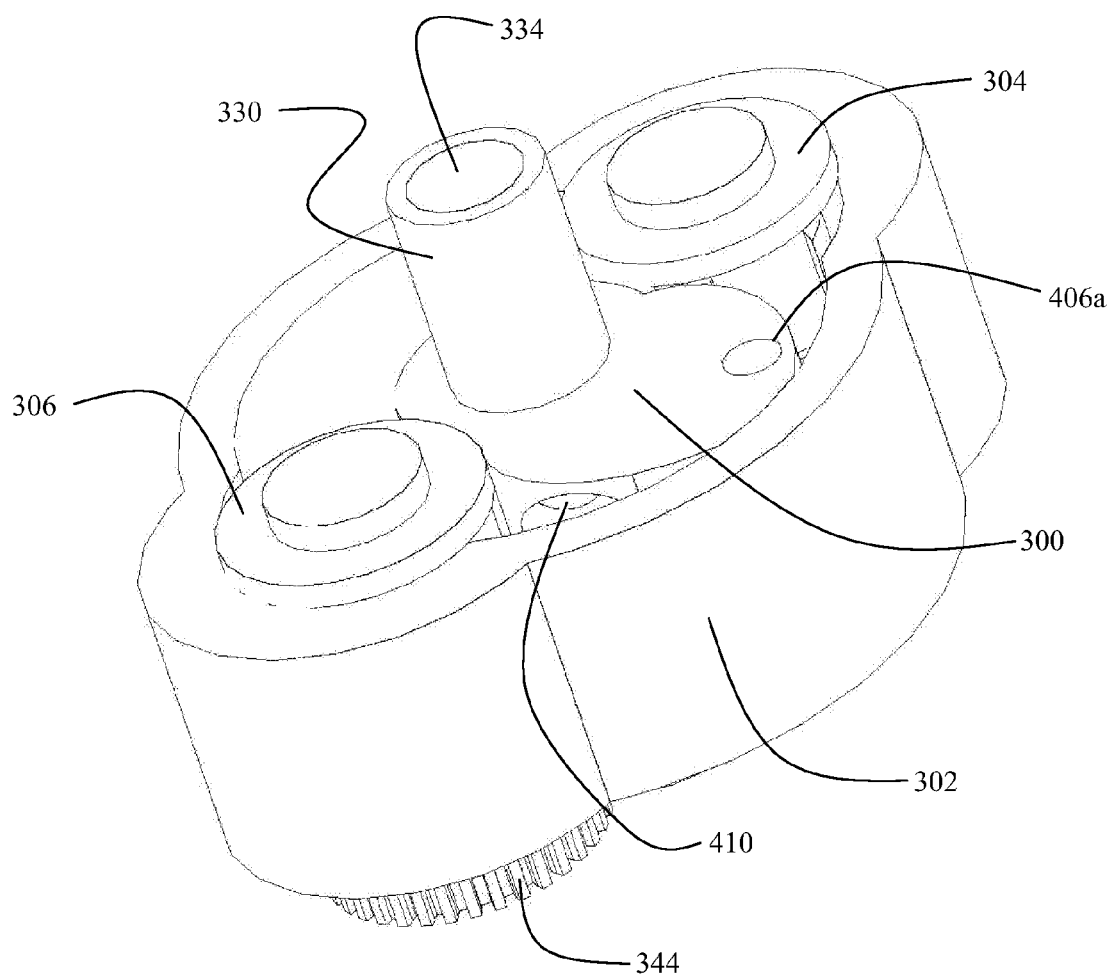
FIG. 7B is an isometric view of the expander embodiment of FIG. 7A.

An alternative embodiment of the generalized fluid transfer machine operates as an expander for pressurized gases. As shown in FIGS. 7A-7E, the expander embodiment incorporates a main rotor 300 with an asymmetric lobe 308 and peripheral rotors 304 and 306 rotating in uniform circular motion with the main rotor in a case 302. Operational elements associated with the rotors and case are numbered identically to those in the description of the initial embodiment. To allow adequate sealing for pressurized gas expansion, the expander embodiment employs a gas inlet receiving high pressure gas from the inlet conduit 336 in the axle proceeding through a lateral bore 402 in the lobe attaching to a vertical bore 404 near the periphery of the lobe which exits the top surface of the lobe through aperture 406a and the bottom surface through aperture 406b. Gas outlet is accomplished through a port 410 in the lobe which connects to outlet conduit 334. As shown in FIG. 7A, outlet port 410 is located in the lobe advancing surface 348 on the advancing side of a symmetry centerline of the lobe while the vertical bore and apertures of the inlet are located in the retreating surface 352 of the lobe relative to the centerline.

Figure 7C:
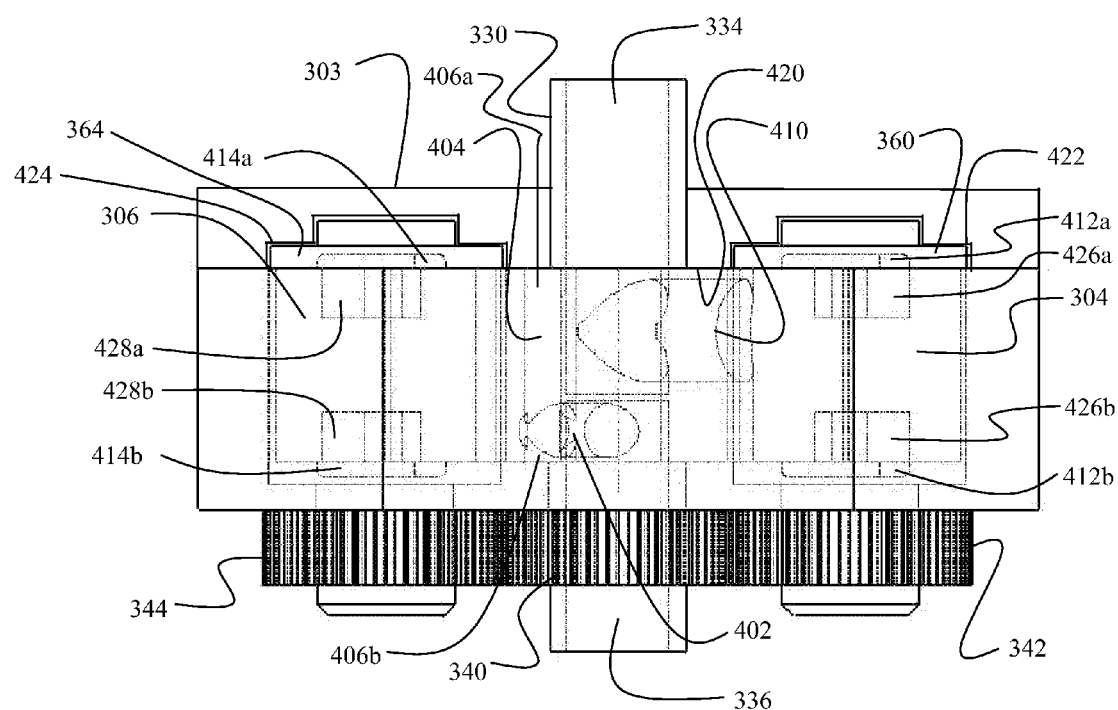
FIG. 7C is a side hidden line view of the expander embodiment with the case cover in section.
Figure 7D:
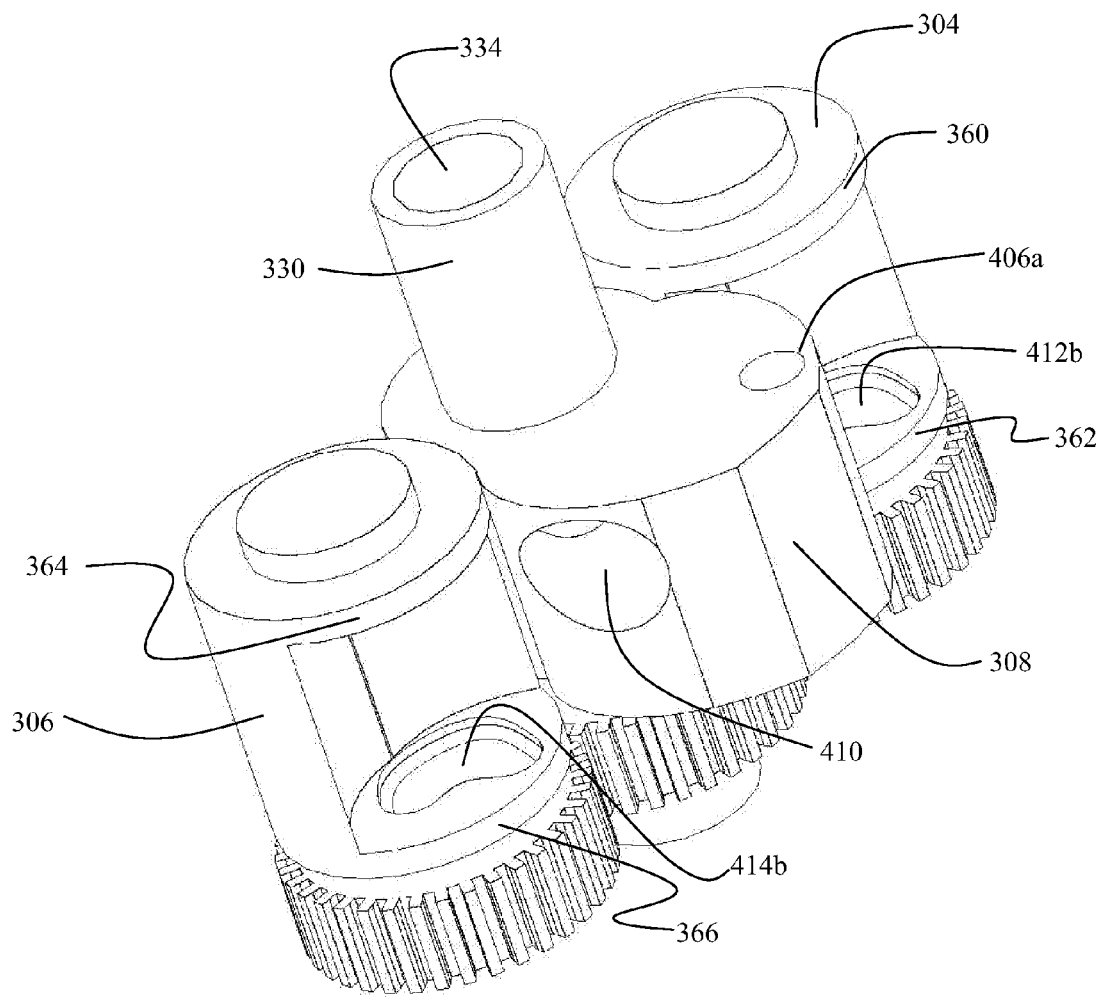
FIG. 7D is an isometric view of the main and peripheral rotors without the case.
Figure 7E:
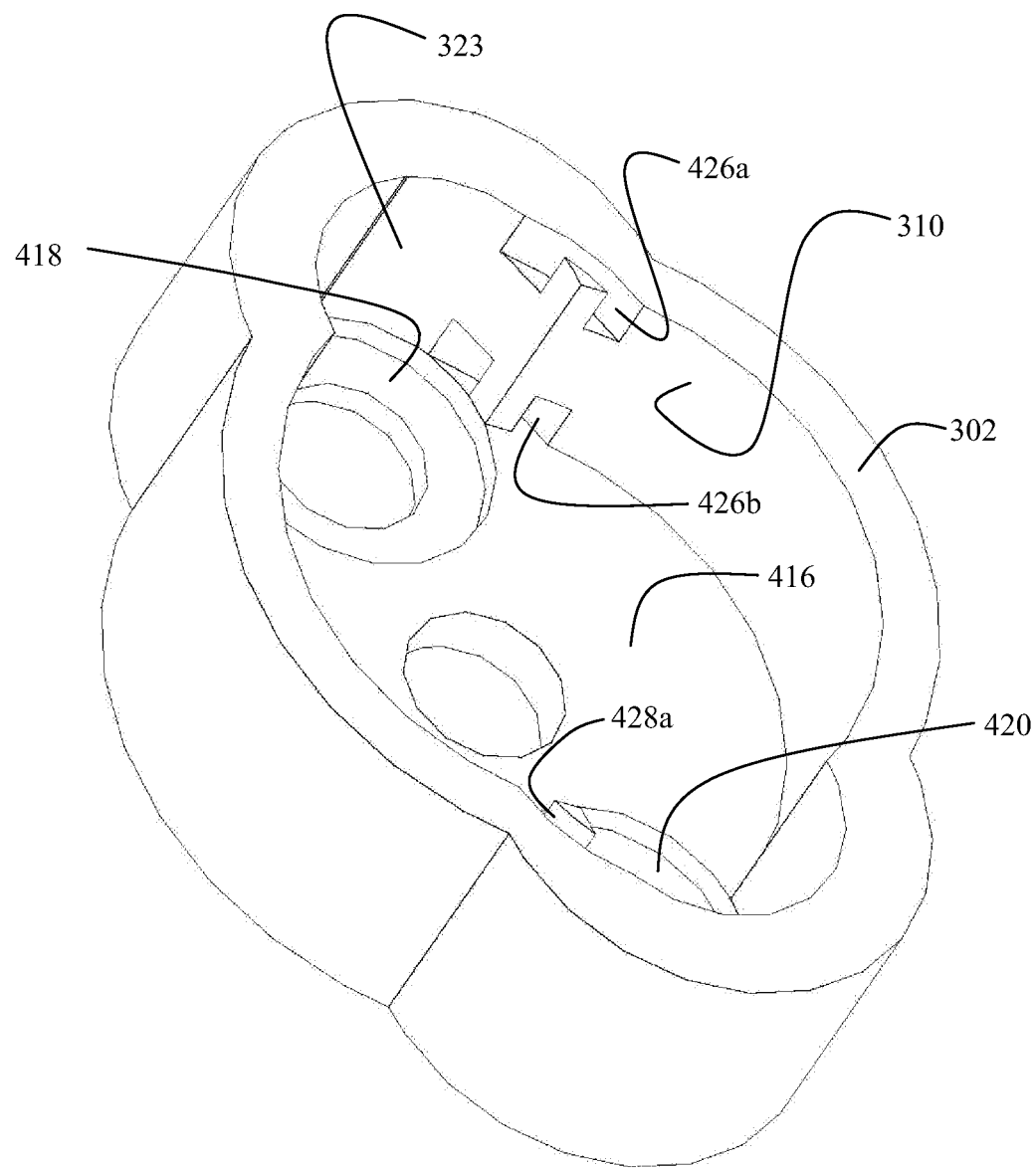
FIG. 7E is an isometric view of the case showing the flow continuation ports.

As best seen in FIG. 7D, the embodiment includes transfer depressions 412a and 412b in the upper cylindrical extension 360 and lower cylindrical extension 362 of rotor 304 and transfer depressions 414a and 414b in the upper cylindrical extension 364 and lower cylindrical extension 366 of rotor 306 to port expansion gas from apertures 406a and 406b as will be described in greater detail subsequently. Case 302 shown in FIG. 7E has a sealing surface 416 for lower aperture 406b. Recesses 418 and 420 in the case end wall receive lower cylindrical extensions 362 and 366 of rotors 304 and 306. As best seen in FIG. 7C, sealing surface 420 in the case cover 303 is provided for sealing upper aperture 406a and recesses 422 and 424 receive upper cylindrical extensions 360 and 364. Residual gas relief ports 426a and 426b connect rotor chamber 323 with operating volume 382 and residual gas relief ports 428a and 428b connect rotor chamber 325 with operating volume 380 as will be described in greater detail subsequently.

Figure 8A:
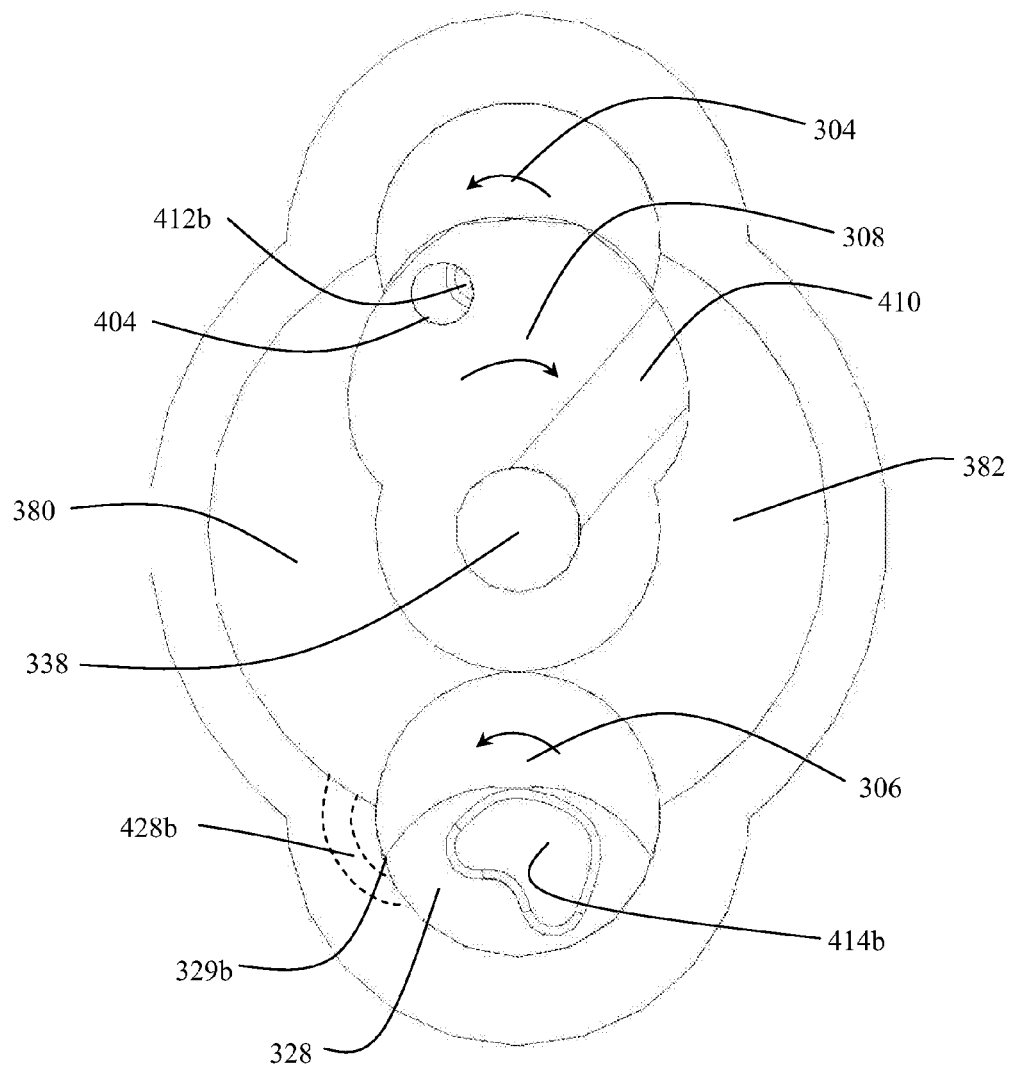
FIGS. 8A-8E are incremental views in the rotation cycle of the embodiment of FIGS. 7A and 7B.

Operation of the expander embodiment is described with respect to FIGS. 8A-8E. FIG. 8A shows the main rotor in the top dead center position. As in the prior described embodiments, in this position lobe 308 closes recess 326 in rotor 304. Rotor 306 is in a rotated position closing recess 328 in the rotor chamber 325. Rotation of the main rotor in the embodiment shown in the drawings is clockwise. Port 410 receives gas in operating volume 382 expanded in a prior rotation as the lobe advances into the volume. As seen in the section view provided by FIG. 8A, the transfer depressions 412a and 412b are beginning communication with inlet bore 404 through upper and lower apertures 406a and 406b. Edge 329b of the recess in rotor 306, which is the leading edge with the main rotor turning in clockwise motion and the peripheral rotors counterclockwise, is approaching but has not yet sealed residual gas relief ports 428a and 428b allowing residual gas in recess 328 from the prior expansion to fully expand into operating volume 380 as the lobe continues to recede.

Figure 8B:
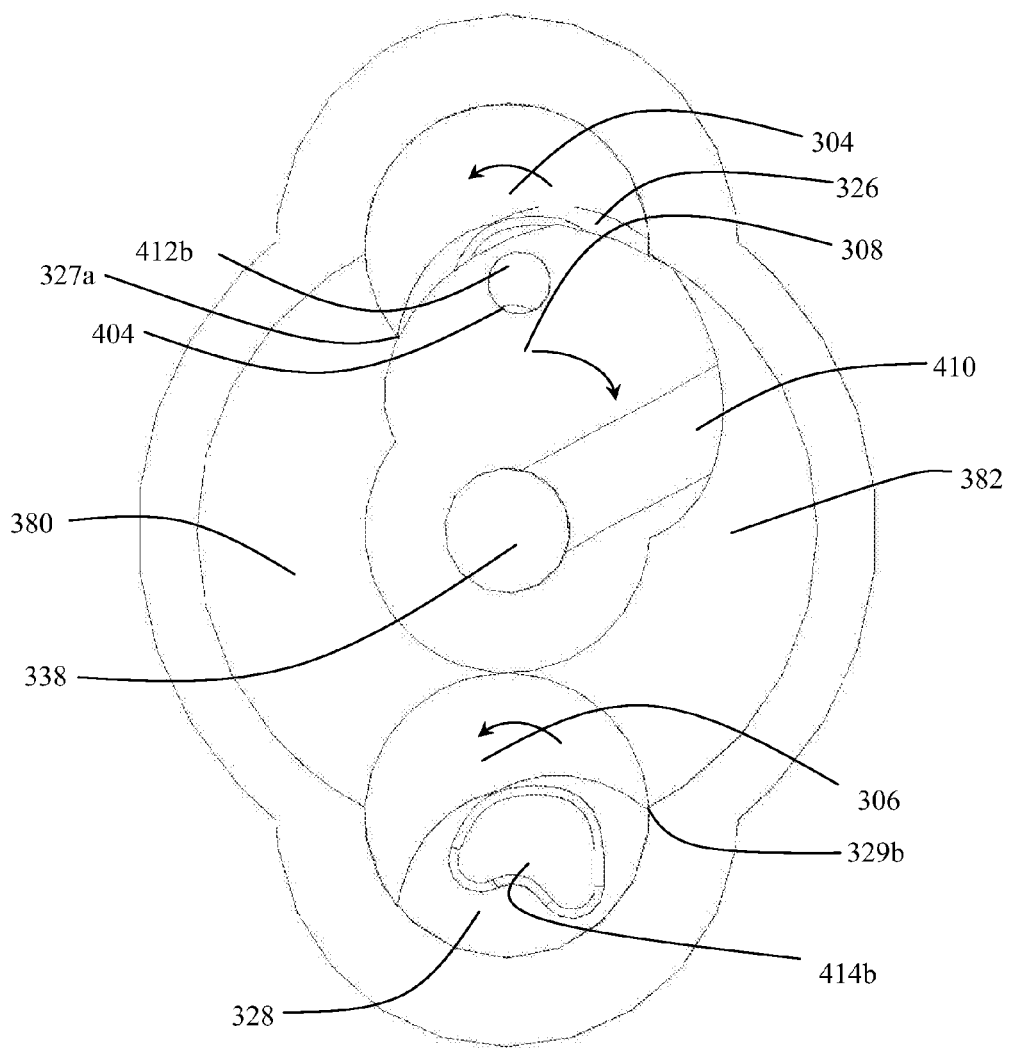
Figure 8C:
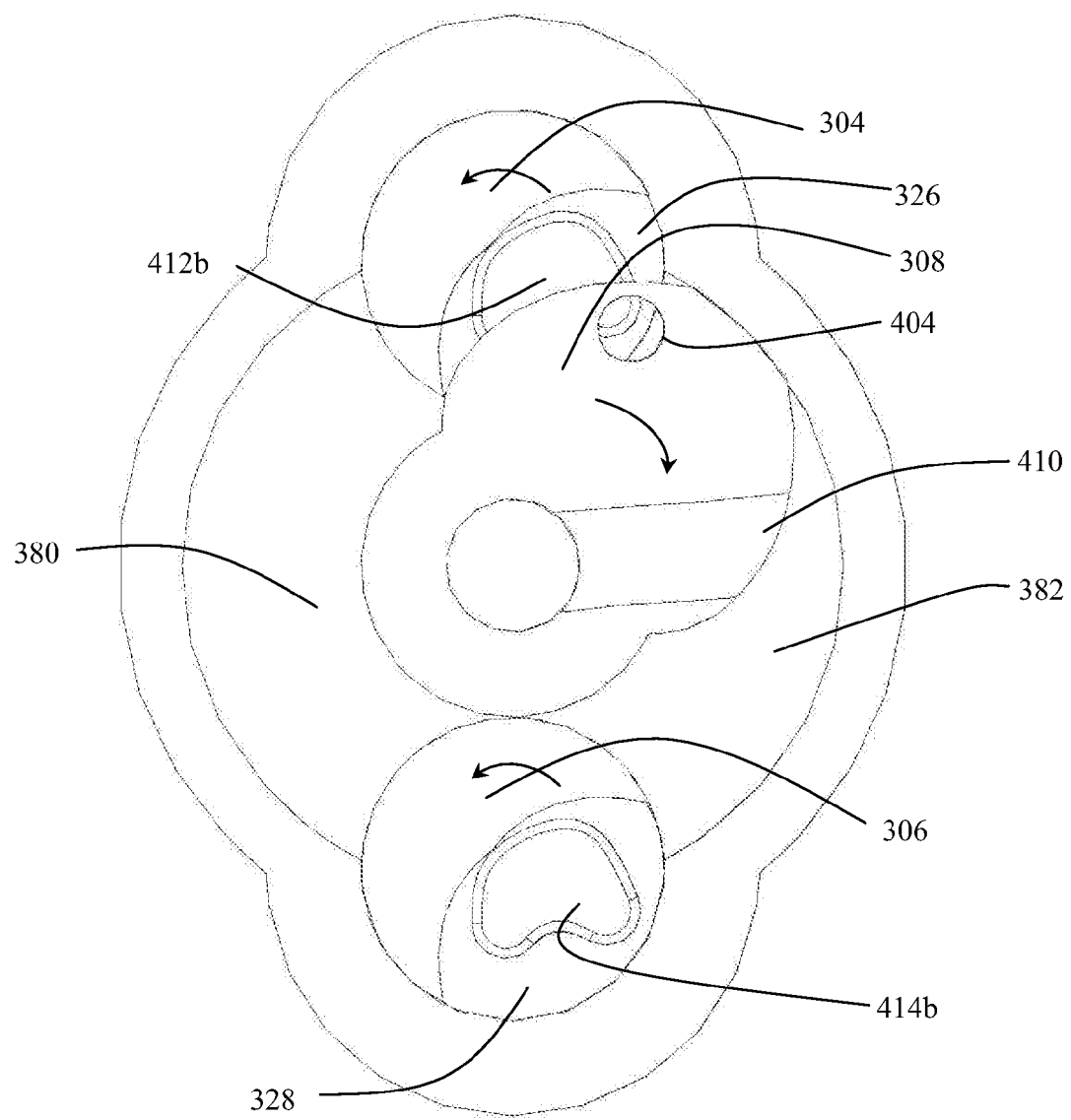

As shown in FIG. 8B where the main rotor has rotated 22.5°, gas is flowing from the inlet through the transfer depressions in rotor 304 and flowing into recess 326 which is opening in rotor 304 as the lobe transitions into operating volume 382. Leading edge 327a of the recess is sealing against the lobe with respect to operating volume 380. Rotor 306 recess trailing edge 329b has not yet cleared the rotor chamber and recess 328 remains closed. However, leading edge 327a has now sealed residual gas relief ports 428a and 428b to prevent communication between operating volume 380 and 382 when recess 328 opens to operating volume 382. A further 22.5° of rotation to 45° as shown in FIG. 8C and the inlet apertures are now reaching the termination of transfer depressions 412a and 412b. When the lobe rotates to seal apertures 406a and 406b against the case sealing surface 416 and cover sealing surface 420 the gas charge for expansion has been fully ported into recess 326 in rotor 304. Sealing bight 354 on the lobe is now sealing against the case inner surface 310. Recess 328 in rotor 306 has now been opened to operating volume 382 and residual gas from the prior expansion continues to be swept into outlet port 410.

Figure 8D:
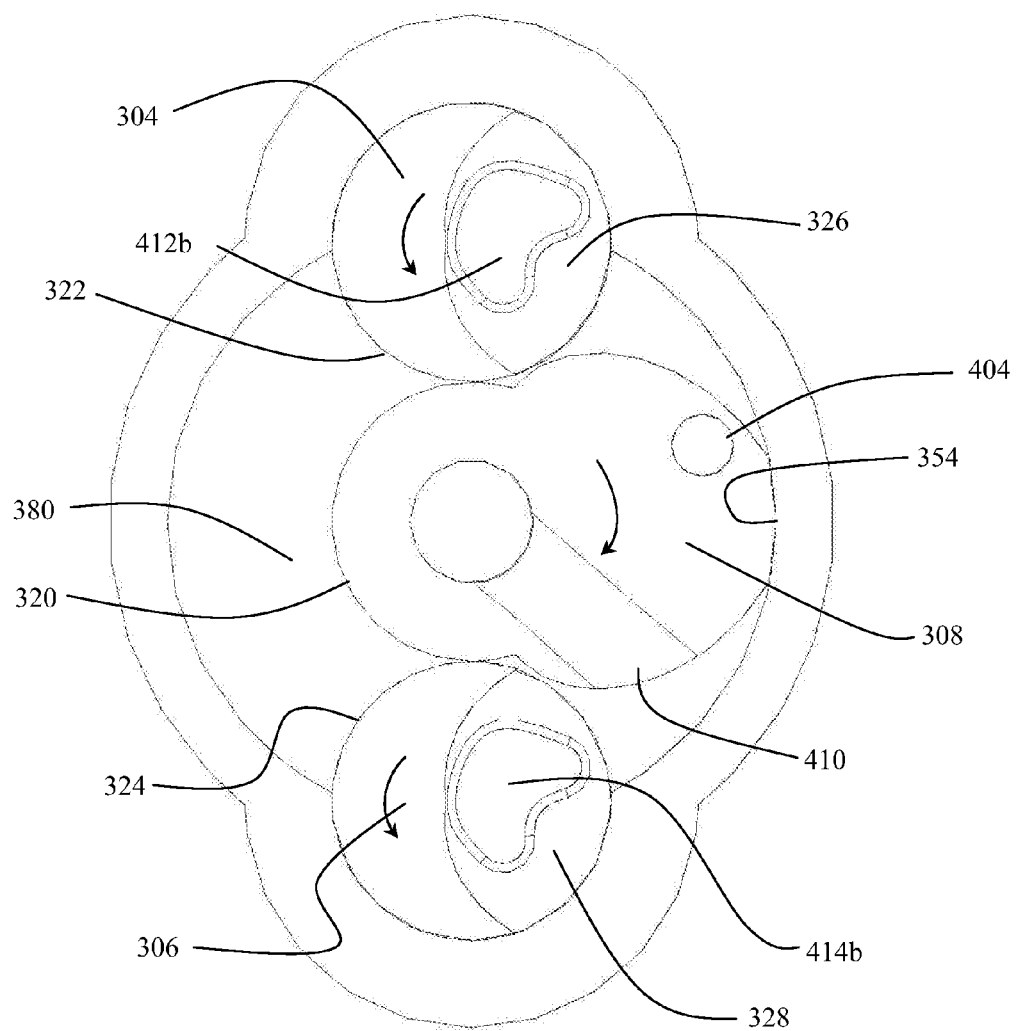

FIG. 8D shows the rotor configuration at 90° of rotation. Cylindrical surface 322 of rotor 304 and cylindrical surface 324 of rotor 306 are sealing against main rotor body 320. The gas charge is expanding against the retreating lobe surface. Apertures 406a and 406b at the extents of bore 404 are sealed against sealing surfaces 416 and 420 and residual gas from the prior expansion continues to be swept into outlet port 410 by the advancing lobe surface. FIG. 8D shows an exemplary profile for the transfer depressions 412b and 414b (which are identical to transfer depressions 412a and 414a in the upper cylindrical extensions of the rotors). The extent of the depression is defined to interface with the rotating inlet apertures and to provide a flow path into the recess as the lobe rotates through thereby opening the recess. Length and profile of the transfer depressions determines the expansion ratio for the working gas by limiting the charge transferred prior to sealing of the inlet apertures on the upper and lower surfaces of the recess formed by the rotor cylindrical extensions and the sealing surfaces of the case and cover. Depths of the depressions are determined to provide sufficient area for desired gas flow rates at the operating pressure of the system but are minimized to prevent excess volume.

Figure 8E:
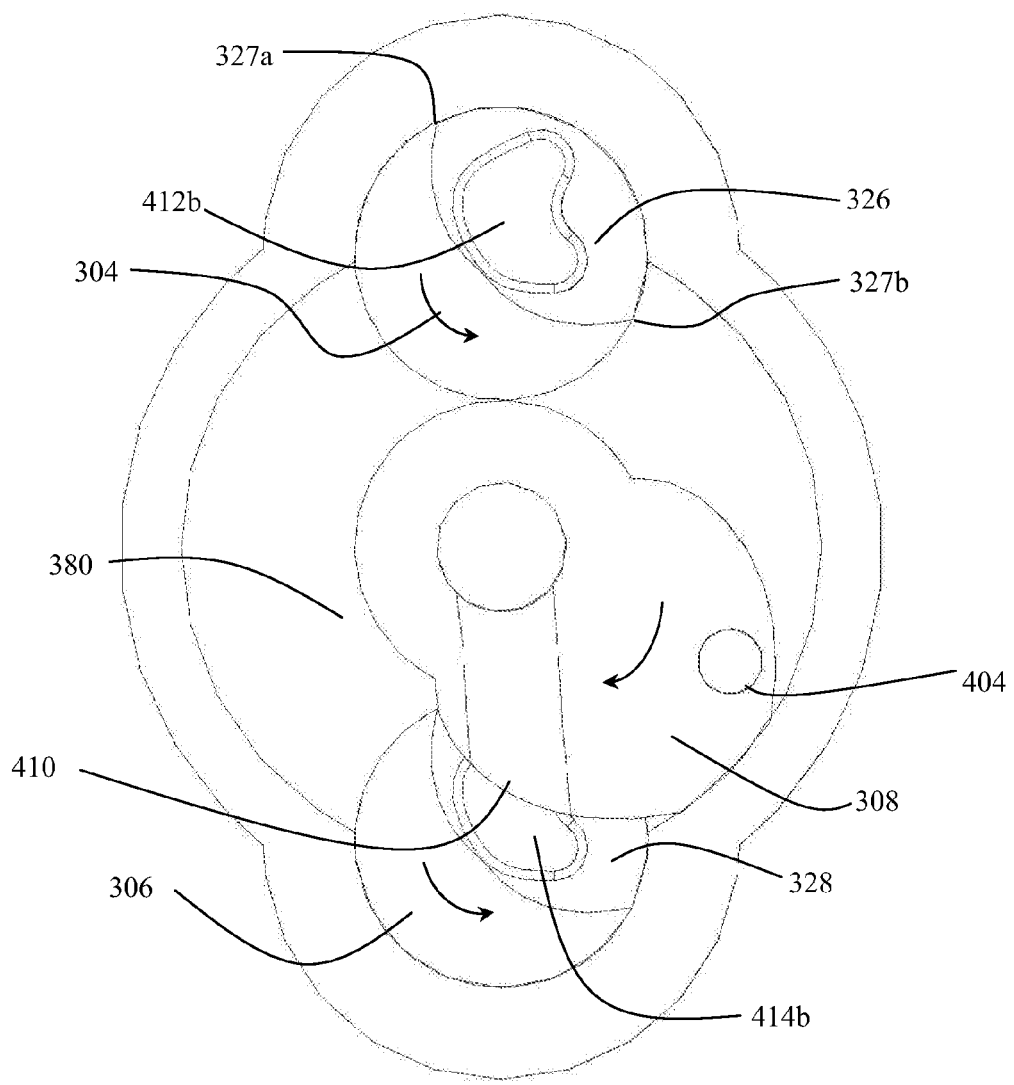

FIG. 8E shows the rotor configuration at 135° of rotation. Expansion of the gas charge in operating volume 382 is continuing against the retreating lobe surface. leading edge 327a of recess 326 in rotor 304 is approaching closure in the rotor chamber. final residual gas volume in recess 328 of rotor 306 is being swept into outlet port 410 by the advancing surface of the lobe and the lobe is beginning to rotate into the recess to deplete the volume.

At 180° of rotation, the lobe, now at bottom dead center, has closed recess 328 in rotor 306. Rotor 304 has rotated to close recess 326 in rotor chamber 323. However since expansion of operating volume 382 continues as the lobe rotates past 180°, residual gas ports 426a and 426b remain open to operating volume 382 allowing gas in recess 326 to continue to expand. Residual gas ports 426a and 426b are then closed by the leading edge 327b of recess 326 prior to trailing edge 327a of the rotor opening past the rotor chamber.

A second 180° of rotation provides a second expansion cycle employing operating volume 380 and recess 328 in rotor 306 in a manner identical to that described above.

Figure 9A:
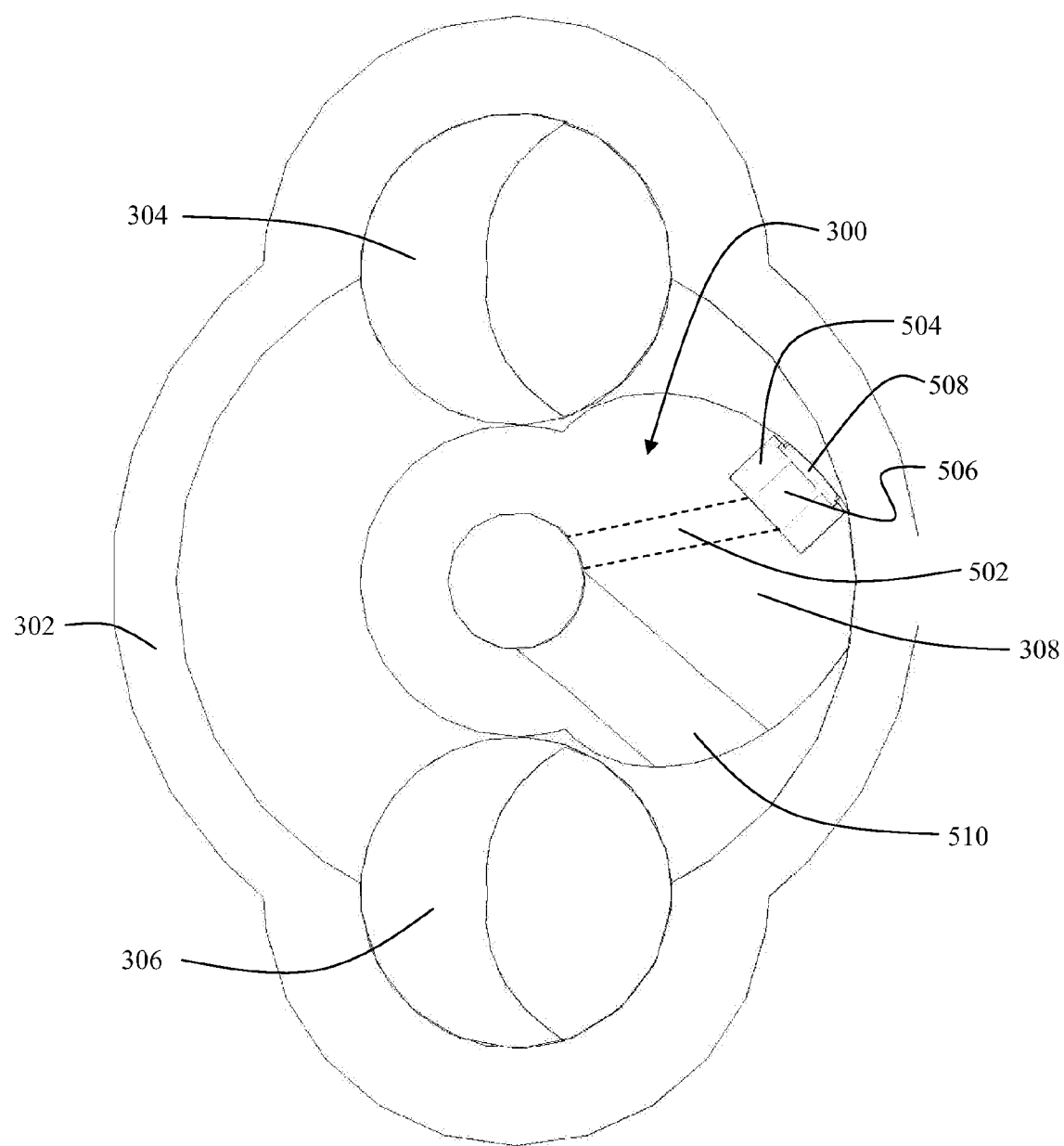
FIG. 9A is a top section view of a compressor embodiment.
Figure 9B:
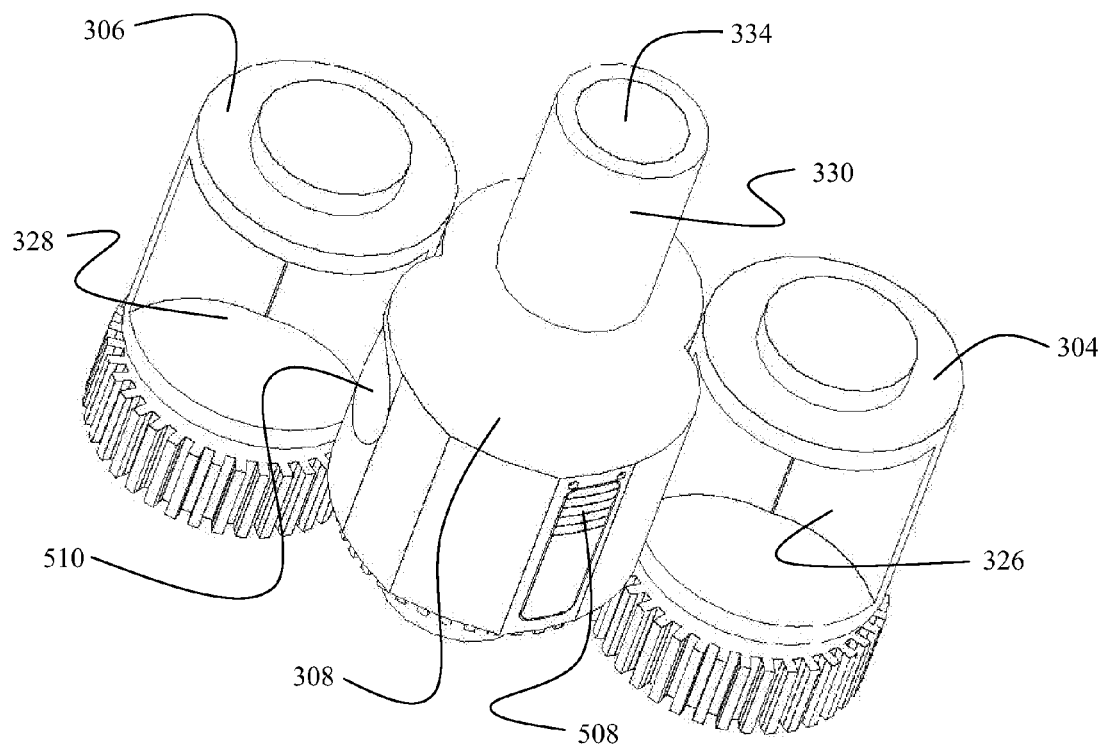
FIG. 9B is an isometric view of the rotors in the compressor embodiment of FIG. 9A.

Yet another embodiment of the generalized fluid transfer engine is employed as a gas compressor. As shown in FIGS. 9A and 9B, the compressor embodiment incorporates a main rotor 300 with an asymmetric lobe 308 and peripheral rotors 304 and 306 rotating in uniform circular motion with the main rotor in a case 302. Operational elements associated with the rotors and case are numbered identically to those in the description of the initial embodiment. The compressor embodiment, similar to the expander embodiment, employs a lateral bore 502 from conduit 336 to a vertical chamber 504. Unlike the expander, the vertical chamber is not vented to the top and bottom surfaces of the lobe but has an inlet chamber 506 in the advancing surface of the main rotor lobe covered by a Reed valve 508, the operation of which will be described in greater detail subsequently. Gas for compression is supplied through port 510 the retreating surface of the main rotor lobe which communicates with conduit 336.

Figure 10A:
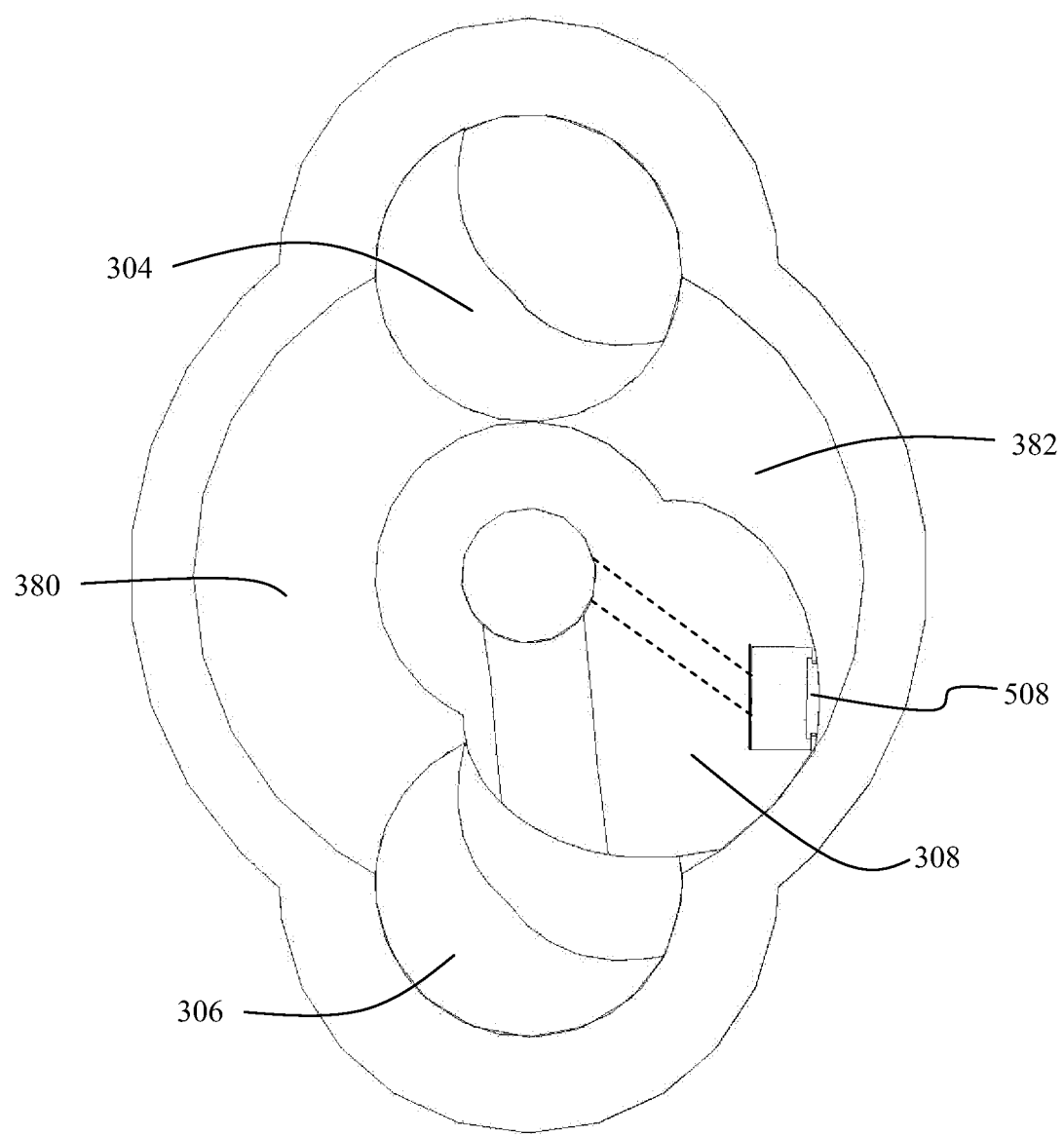
FIGS. 10A-10D are incremental views in the rotation cycle of the embodiment of FIGS. 9A and 9B.

FIGS. 10A-10D (and FIG. 9A) show various rotor positions for the compressor during one 180° rotation of the rotors. The initial position for this operational description is with the main rotor at bottom dead center and rotating counterclockwise. As shown in FIG. 10A, the main rotor has rotated through 45° compressing gas in operating volume 382 and recess 326 which is sealed by rotor 304. Reed valve 508 remains sealed by back pressure from the high pressure gas outlet through vertical chamber 506 and lateral bore 502 to conduit 336. Compression of gas in the operating volume is only working against full back pressure of the outlet when compression to that pressure has actually occurred. Compression is substantially adiabatic until the Reed valve opens and then become isobaric for displacement of the working gas volume into the outlet resulting in high operational efficiency. Rotation of the main rotor to 90° is shown in FIG. 9A with further compression of the gas in operating volume 382 and recess 326 which remain sealed by rotor 304 engaging the surface of the main rotor.

Figure 10B:
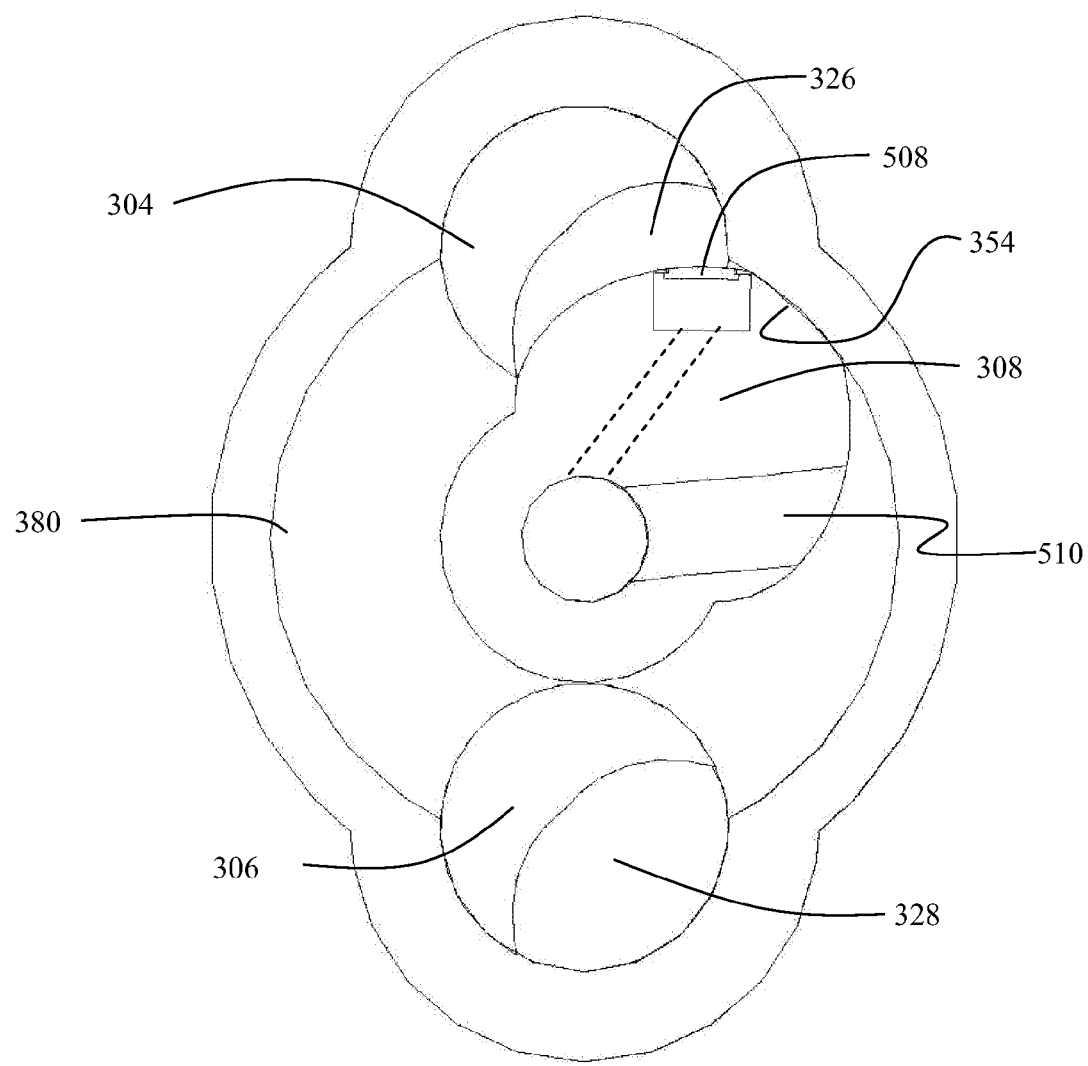

FIG. 10B shows the rotor at 135° of rotation. Sealing bight 354 on the lobe remains engaged with the case inner wall however gas in the operating volume has now been compressed into recess 326. Depending on the gas back pressure, Reed valve 508 remains closed. Operating volume 382 is being replenished with inlet gas through port 510 in the retreating surface of the lobe. Recess 328 in rotor 306 also contains gas at inlet pressure which is carried through for addition to compression charge in operating volume 380 during the 180° rotation following the lobe reaching top dead center.

Figure 10C:
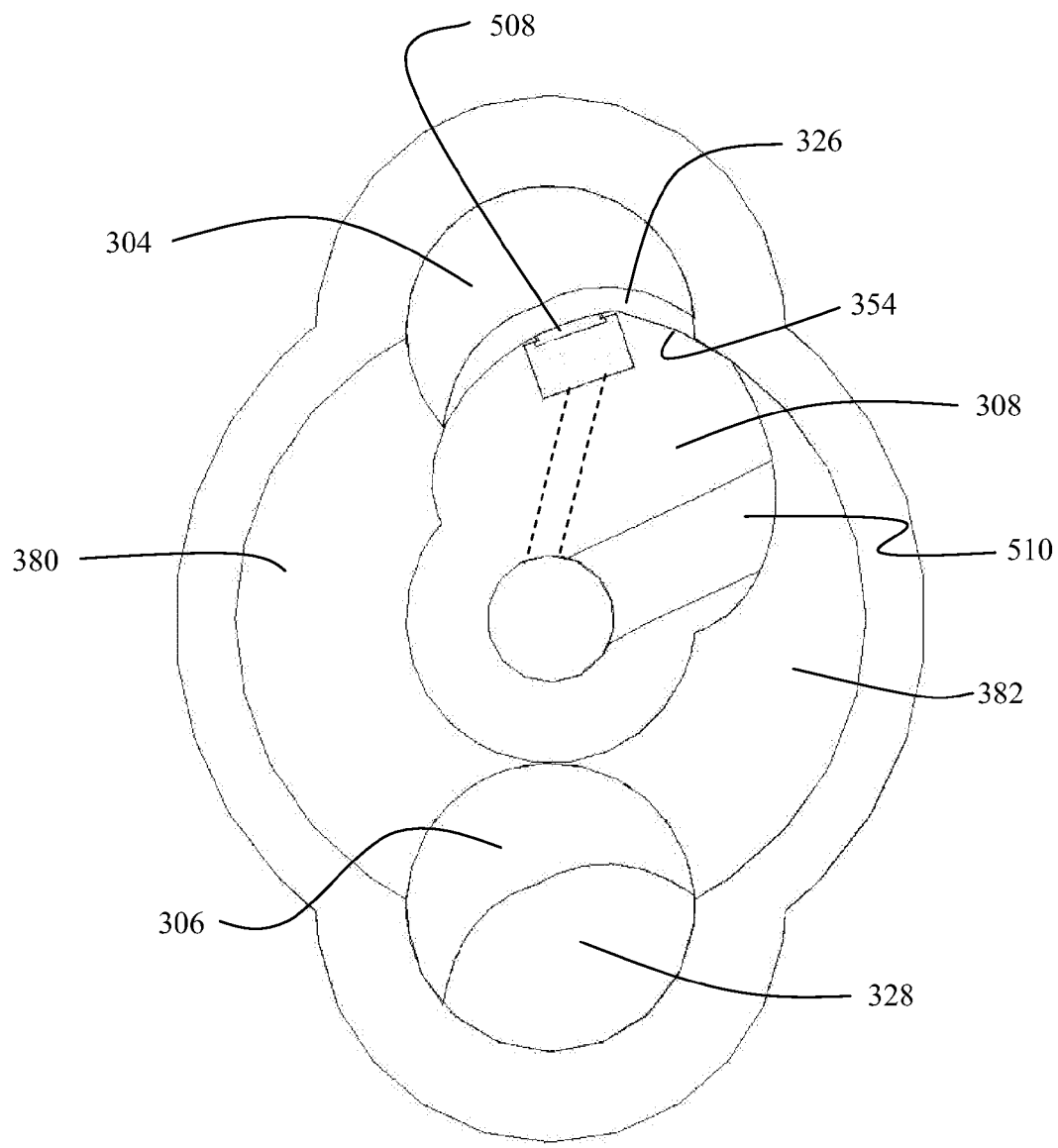
Figure 10D:
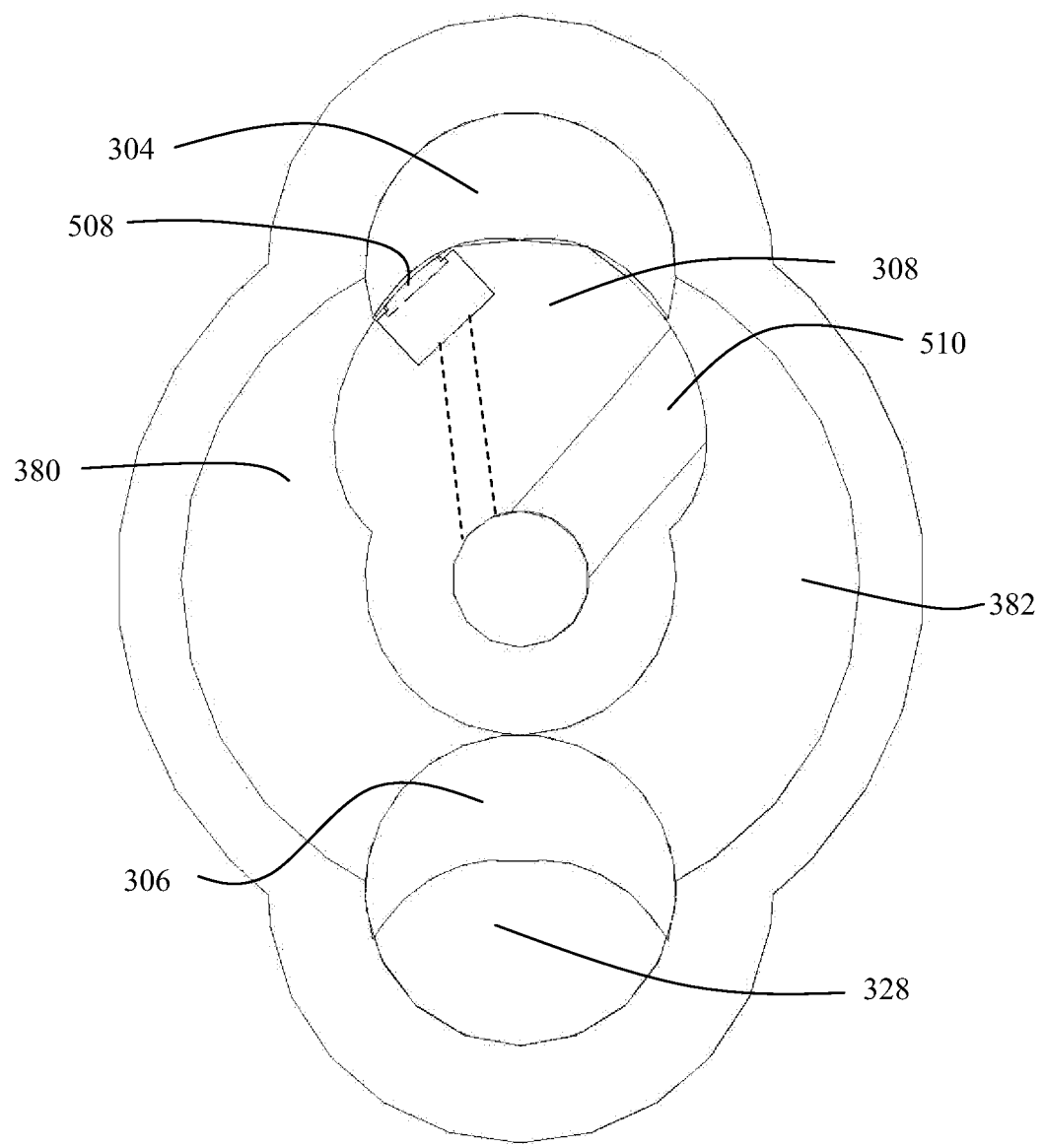

FIG. 10C shows the rotor after 157.5° of rotation. Compressed gas in recess 326 has now reached outlet pressure and Reed valve 508 opens to admit the pressurized gas charge for displacement through vertical chamber 506 and lateral bore 502 to conduit 336. Recess 328 has now been closed by rotor 306 containing gas at inlet pressure which is carried through for addition to compression charge in operating volume 380. FIG. 10D shows the main rotor at top dead center at the completion of the 180° cycle. Operating volume 382 has been replenished with inlet gas through port 510. Gas in recess 326 has been fully displaced into the vertical chamber 506 through Reed valve 508. Compression of gas in operating volume 380 and recess 328 now occurs during the next 180° of rotation in the same manner as described.

Sizing of the fluid transfer engine can be accomplished to accommodate desired operating volumes, pressures and other system characteristics. However, relative sizing of the lobe via the major radius of the main rotor, sealing bight arc and profile of the recesses in the peripheral rotors based on the ratio of major radius of the main lobe to diameter of the peripheral rotors are tailored for desired efficiency. Volumetric loss due to required clearance volumes in the sculpted recesses of the peripheral rotors is determined by the arc segment of the sealing bight.

Figure 11:
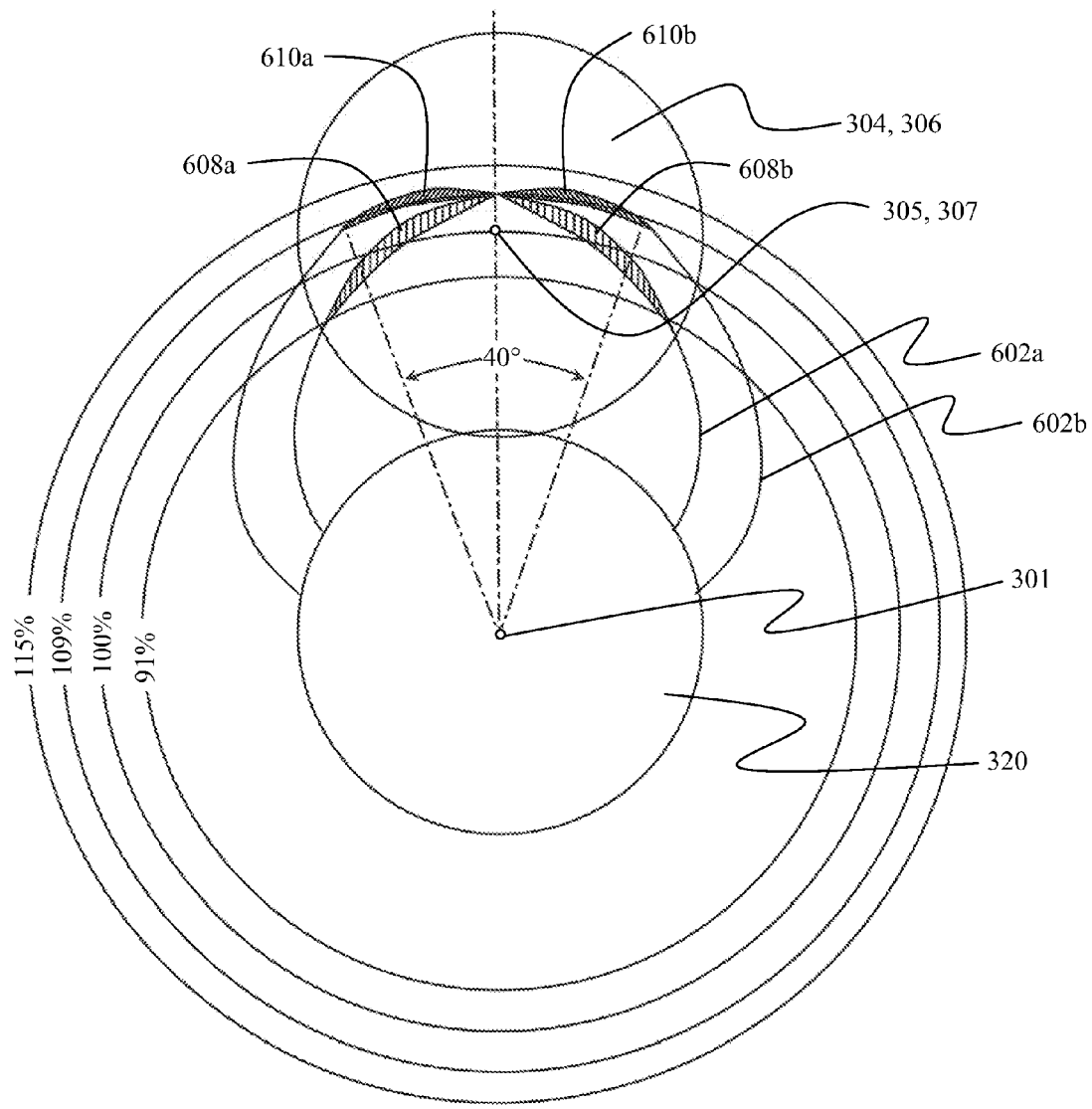
FIG. 11 is a top view overlay of clearance volumes in the peripheral rotors with contact arcs of 0° (point contact) and 40° at an exemplary major radius on the main rotor of 109% of the center of rotation of the peripheral rotors.

FIG. 11 shows an exemplary lobe profile 602a for a point contact of the lobe with the case inner wall and recesses. A lobe profile 602b results from a 40° arc of contact for the sealing bight. For the two examples shown, the major radius of the main rotor lobe from the center axis 301 is 109% of the radial distance to the center of rotation 305, 307 of the peripheral rotors 304, 306. For the point contact lobe, clearance volumes 608a and 608b are required in the sculpted recess to accommodate rotational interaction of the point contact lobe while maintaining sealing of the peripheral rotor. This volume is lost from overall volumetric efficiency of the fluid transfer capability of the system. Similarly for the 40° arc of contact for the sealing bight, clearance volumes 610a and 610b are required also resulting in volumetric efficiency loss. Exemplary optimized embodiments of the main rotor lobe as described in the embodiments herein provide a sealing bight arc of between 20° and 25°, nominally 23°, for minimizing clearance volume and maximizing volumetric efficiency. Alteration of the bight arc to accommodate sealing requirements at operating pressures or other operational considerations may be accomplished between the point contact and 40° arcs.

Figure 12:
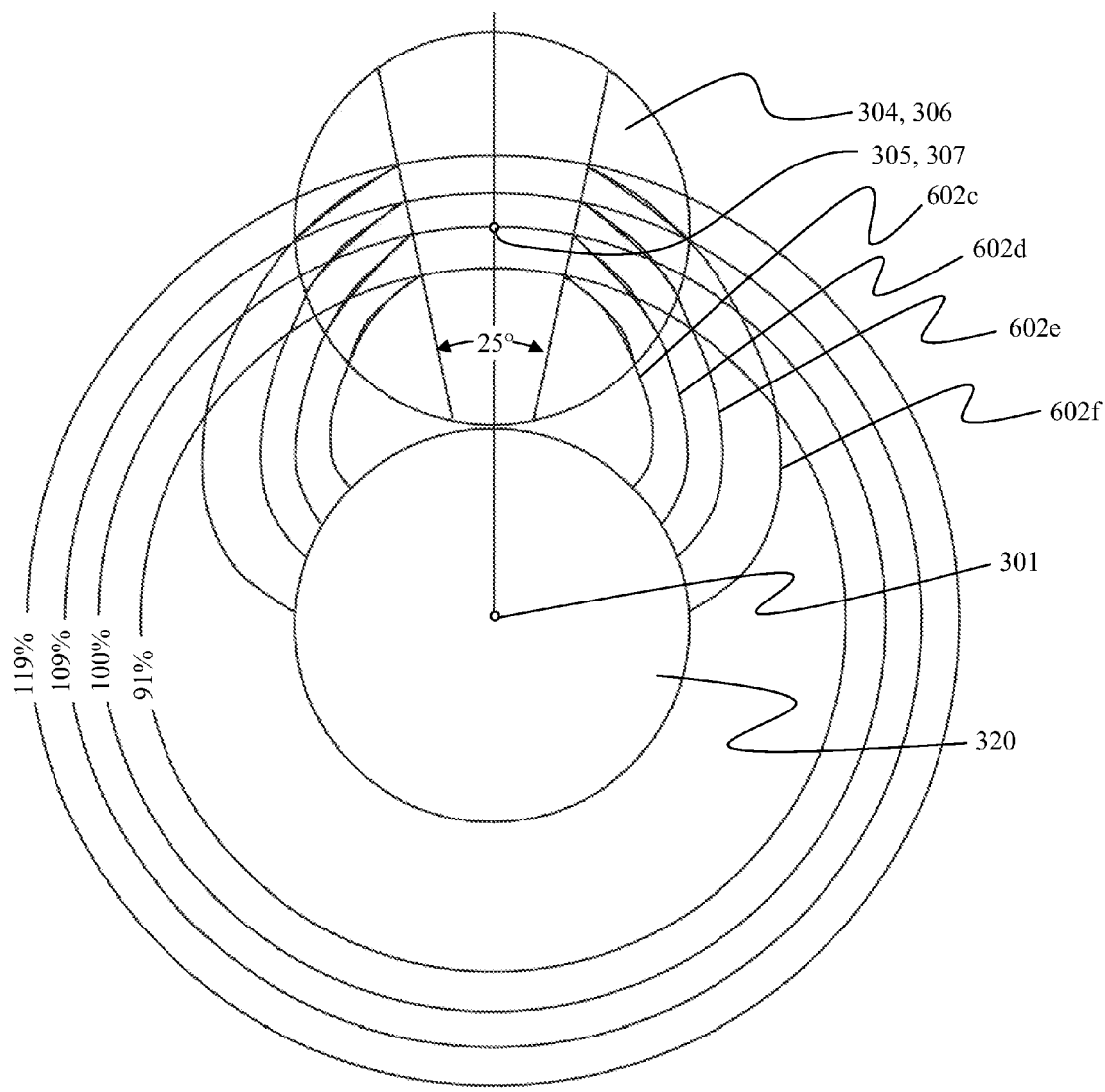
FIG. 12 is a top view overlay of asymmetrical lobe shapes for a 25° contact arc between the asymmetrical lobe and the case wall at selected major diameters.

Efficiency is also affected by the relationship of the main rotor major radius and the peripheral rotor centers of rotation. FIG. 12 demonstrates the various main rotor lobe shapes and the associated clearance volumes for a 25° sealing bight on the lobe and major radii ranging from 91% to 119% of the distance from the axis of rotation of the main rotor 301 to the center of rotation of the peripheral rotors 305, 307. For a major radius of 91% a lobe profile 602c results. For a major radius of 100% (coincident with the center of rotation for the peripheral rotors) a lobe profile 602d results. Major radii of 109% and 119% result in lobe profiles 602e and 602f respectively. A major radii of about 109% produces an optimized swept volume relative to lobe profile.

Figure 13:
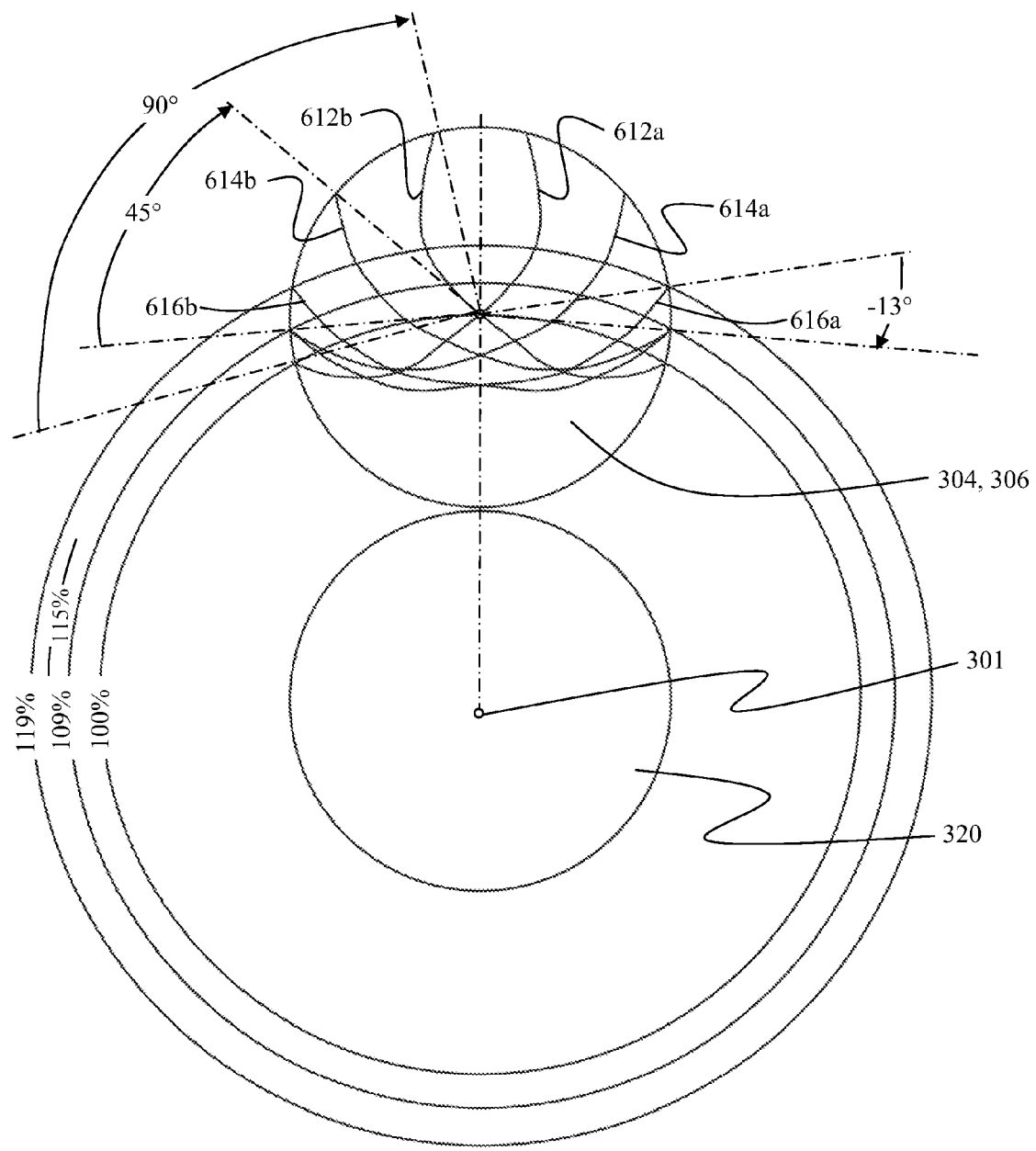
FIG. 13 is a top view overlay of close over of the peripheral rotor lobe contact recess at selected major radii of the main rotor lobe.

Close over of the leading and trailing edges of the recesses in the peripheral rotors with the associated rotor chamber is affected by the ratio of major radius of the main lobe to center of rotation of the peripheral rotors limiting the ratio. As shown in FIG. 13 for a recess profile corresponding to a 25° sealing bight arc, a 100% major radius results in a profile 612a (rotating clockwise) and 612b (rotating counterclockwise) with a close over angle of approximately 90°. Similarly a 109% major radius results in a profile 614a (rotating clockwise) and 614b (rotating counterclockwise) with a close over angle of 45° obtained. A 115% major radius (not shown) provides a close over angle of about 11.5°. However, at 119% a profile 616a (rotating clockwise) and 616b (rotating counterclockwise) results in a close over angle of −13° which precludes complete closure of the recess within the rotor chamber.

Having now described the embodiments of the invention as required by the patent statutes, those skilled in the art will recognize modifications and substitutions for the elements of the embodiments disclosed. Such modifications and substitutions are within the intent of the presently disclosed embodiments as defined by the following claims.

What is claimed is:

1. An expander comprising:
   a case with a cylindrical inner wall having an operating radius extending from a case axis to form an operating chamber;
   a main rotor carried within the case by an axle and having a lobe with a major radius equal to and concentric with the operating radius, said lobe having an advancing surface and a retreating surface, said main rotor having a minor radius defining a body;
   two peripheral rotors diametrically opposed with respect to the case axis and rotating within rotor chambers extending from the case, each rotor having a radius equal to the minor radius and a center of rotation located at twice the minor radius from the case axis, each of said peripheral rotors rotating in uniform circular motion with the main rotor in sealing contact with the body and having a sculpted recess for receiving the lobe of the main rotor with upper and lower cylindrical extensions extending longitudinally from each extent of the recess;

said case incorporating a cover, said cover and said case each having a sealing surface for an upper surface and lower surface of the main rotor lobe respectively and said lobe including a bore having an aperture in at least one of the upper or lower surface communicating with a first conduit in the axle, said first conduit receiving pressurized gas for expansion, said upper and lower cylindrical extensions including at least one transfer depressions in one of said upper and lower cylindrical extensions in each peripheral rotor for communication with said aperture, an expansion volume formed by a first of said peripheral rotors and the retreating surface of the lobe;

said advancing surface of the lobe incorporating a port communicating with a second conduit in the axle and displacing expanded gas in the operating volume between the advancing surface of the lobe and a second of the peripheral rotors.

2. The expander as defined in claim 1 further comprising at least one gas relief port extending from each transfer depression to the operating chamber.

3. The expander as defined in claim 2 wherein the at least one gas relieve port comprises a gas relief port located adjacent the lower cylindrical extension and a second gas relief port located adjacent the upper cylindrical extension.

4. The expander as defined in claim 1 wherein an expansion ratio is defined by a length and profile of the transfer depressions.

5. The expander as defined in claim 4 wherein a depth of the transfer depressions is determined to provide sufficient area for desired gas flow rates at an operating pressure.

\* \* \* \* \*